(12) United States Patent
Ferguson

(10) Patent No.: US 11,953,902 B2
(45) Date of Patent: Apr. 9, 2024

(54) SELECTION OF UNMANNED AERIAL VEHICLES FOR CARRYING ITEMS TO TARGET LOCATIONS

(71) Applicant: United Parcel Service of America, Inc., Atlanta, GA (US)

(72) Inventor: Jerome Ferguson, Princeton, NJ (US)

(73) Assignee: United Parcel Service of America, Inc., Atlanta, GA (US)

( * ) Notice: Subject to any disclaimer, the term of this patent is extended or adjusted under 35 U.S.C. 154(b) by 3 days.

(21) Appl. No.: 17/374,137

(22) Filed: Jul. 13, 2021

(65) Prior Publication Data

US 2023/0020135 A1   Jan. 19, 2023

(51) Int. Cl.
| | |
|---|---|
| G05D 1/00 | (2006.01) |
| B64C 39/02 | (2023.01) |
| B64U 101/60 | (2023.01) |
| G01C 21/00 | (2006.01) |
| G05B 13/02 | (2006.01) |
| G05D 1/10 | (2006.01) |
| G06N 3/045 | (2023.01) |

(52) U.S. Cl.
CPC ......... *G05D 1/0088* (2013.01); *G01C 21/005* (2013.01); *G05B 13/027* (2013.01); *G05D 1/102* (2013.01); *G06N 3/045* (2023.01); *B64C 39/024* (2013.01); *B64U 2101/60* (2023.01)

(58) Field of Classification Search
CPC ...... G05D 1/0088; G05D 1/102; G05D 1/104; G01C 21/005; G05B 13/027; G06N 3/045; B64C 39/024; B64U 2101/60; G06Q 10/08; G08G 5/00
See application file for complete search history.

(56) References Cited

U.S. PATENT DOCUMENTS

| | | | | |
|---|---|---|---|---|
| 9,348,333 | B1* | 5/2016 | Buchmueller | ........... B64D 1/08 |
| 9,650,136 | B1* | 5/2017 | Haskin | .................... B64U 10/13 |
| 10,437,252 | B1* | 10/2019 | Liu | ..................... G01C 21/3878 |
| 2018/0136648 | A1* | 5/2018 | Su | ....................... G01C 21/3453 |
| 2018/0137454 | A1* | 5/2018 | Kulkarni | ............... B64C 39/024 |
| 2018/0281946 | A1* | 10/2018 | Obaidi | ................. G08G 5/0017 |
| 2019/0019143 | A1* | 1/2019 | Cantrell | ................ G06F 3/0482 |
| 2019/0043370 | A1* | 2/2019 | Mulhall | ................... B64F 1/32 |
| 2019/0114564 | A1* | 4/2019 | Ferguson | ......... G06Q 10/06312 |
| 2020/0178717 | A1 | 6/2020 | Gil | |
| 2020/0180880 | A1 | 6/2020 | Gil et al. | |
| 2020/0354084 | A1* | 11/2020 | Priest | ........................ B64F 1/32 |
| 2021/0041241 | A1* | 2/2021 | Mitra | ................. G01C 21/3423 |
| 2022/0129840 | A1* | 4/2022 | Negi | ....................... G06N 3/08 |

OTHER PUBLICATIONS

International Search Report and Written Opinion received for PCT Patent Application No. PCT/US2022/032160, dated Sep. 29, 2022, 12 pages.

* cited by examiner

*Primary Examiner* — Anne Marie Antonucci
*Assistant Examiner* — Patrick Daniel Mohl
(74) *Attorney, Agent, or Firm* — Shook, Hardy & Bacon L.L.P.

(57) ABSTRACT

In various aspects, a first set of attributes associated with a target location are determined. The target location is a location that one or more items are to be delivered to by an unmanned aerial vehicle (UAV). The first set of attributes are compared with a second set of attributes. The second set of attributes indicate attributes of each UAV of a plurality of UAVs. Based on the comparing, a UAV, of the plurality of UAVs, is recommended to deliver the one or more items to the target location.

20 Claims, 17 Drawing Sheets

| MISSION PROFILE ID | ITEM WEIGHT | ITEM DIMENSION(S) | FLIGHT DISTANCE | TIME OF MISISON | NUMBER OF ITEMS | TARGET LOCATION COORDINATES | TARGET LOCATION TYPE | WEATHER PROBABILITY | TRAFFIC DATA |
|---|---|---|---|---|---|---|---|---|---|
| 1 | 5 LBS | 5X10 | 20 MILES | 4:30 PM | 1 | 1234 E. MAIN | RESIDENTIAL | RAIN | CONGESTED |
| 2 | | | | | | | | | |
| 3 | | | | | | | | | |
| 4 | | | | | | | | | |

*FIG. 5.*

| UAV PROFILE ID | WEIGHT CARRYING CAPACITY | DIMENSION CAPACITY | FLIGHT DISTANCE CAPABILITY | RELEASE MECHANISM TYPE | WEATHER GRADE INDICATOR | NOISE FACTOR INDICATOR |
|---|---|---|---|---|---|---|
| 1 | 25 LBS | 10X10 | 50 MILES | LANDING RELEASE | RAIN, SNOW | 80 DB |
| 2 | 2 LBS | 10X10 | 10 MILES | TETHER RELEASE | CLEAR CONDITIONS | 20 DB |
| 3 | | | | | | |
| 4 | | | | | | |

PLEASE INPUT MISSION ATTRIBUTES — 1301

- 1302 — ITEM WEIGHT ▽
- 1304 — ITEM DIMENSIONS ▽
- 1306 — NUMBER OF ITEMS ▽
- 1308 — MISSION LOCATION
- 1310 — MISSION TIME
- 1312 — MISSION LOCATION DESCRIPTION

SUBMIT — 1314

BASED ON THESE MISSION ATTRIBUTES, WE RECOMMEND: BRAND A, MODEL B UAV } 1316

CLICK HERE FOR OTHER UAV OPTIONS — 1315

*FIG. 13.*

SELECTION OF UNMANNED AERIAL VEHICLES FOR CARRYING ITEMS TO TARGET LOCATIONS

BACKGROUND

Unmanned Aerial systems or vehicles ("UAVs") (also known as "drones") are aircrafts, which are able to fly without a pilot and passengers on board. UAV controlling is typically performed remotely by radio waves, autonomously (e.g., with a predetermined route), or partially autonomous. In recent years, UAVs have generated significant attention and discussion and are expected to play a major role in transforming life as we know it due to their many important applications. Such applications include real-time monitoring of road traffic, wireless coverage, remote sensing, search and rescue operations, delivery of goods or items, security and surveillance, and civil infrastructure, among others.

There are several expected benefits of UAV technology, as well as some existing challenges. For example, some expected benefits include better traffic monitoring, greater surveillance capacity relative to static cameras, and more efficient delivery. However, a challenge with existing UAV technologies is that some UAVs are not suited to carry particular items (e.g., shipping parcels) to particular target locations, among other things. This can be due to their limited item weight or item size carrying capacity, limited flight distance capability, limited capability for using particular release type mechanisms to release items, or other attributes.

SUMMARY

Various embodiments of the present disclosure are directed to a system, a computer-implemented method, and computer storage media. In some aspects, the system includes one or more processors and computer storage memory having computer-executable instructions stored thereon which, when executed by the one or more processors, implement a method that includes the following operations. A first set of attributes of a geographical area associated with a target location are determined. The target location is a location that one or more items are to be delivered to by an unmanned aerial vehicle (UAV). The first set of attributes are compared with a second set of attributes. The second set of attributes include an indication of a release mechanism type for each UAV, of a plurality of UAVs. Based at least in part on the comparing, a UAV, of the plurality of UAVs, is selected to deliver the one or more items to the target location. Based on the selecting, the UAV is caused to deliver the one or more items to the target location.

In some aspects, the computer-implemented method includes the following operations. A first set of attributes associated with a target location are determined. The target location is a location that one or more items are to be delivered to by an unmanned aerial vehicle (UAV). The first set of attributes are compared with a second set of attributes. The second set of attributes indicate attributes of each UAV of a plurality of UAVs. Based on the comparing, a UAV, of the plurality of UAVs, is recommended to deliver the one or more items to the target location. Based on the recommendation, the UAV is caused to deliver the one or more items to the target location.

In some aspects, one or more computer storage media having computer-executable instructions embodied thereon that, when executed, by one or more processors, cause the one or more processors to perform a method. In some aspects, this method includes the following operations. A mission profile is received. The mission profile describes one or more attributes associated with a delivery of one or more items that are to be made to a target location. A plurality of Unmanned Arial Vehicle (UAV) profiles are received. The plurality of UAV profiles describe one or more attributes of a plurality of UAVs. The mission profile is compared with the plurality of UAV profiles. Based on the comparing, a UAV, of the plurality of UAVs, is selected as a candidate to deliver the one or more items to the target location.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter. In various embodiments, any functionality can be added or removed from the computer-implemented method, the system, and the apparatus described above, such as functionality described with respect to the flow diagrams of FIG. 8.

BRIEF DESCRIPTION OF THE DRAWINGS

Figure 1:
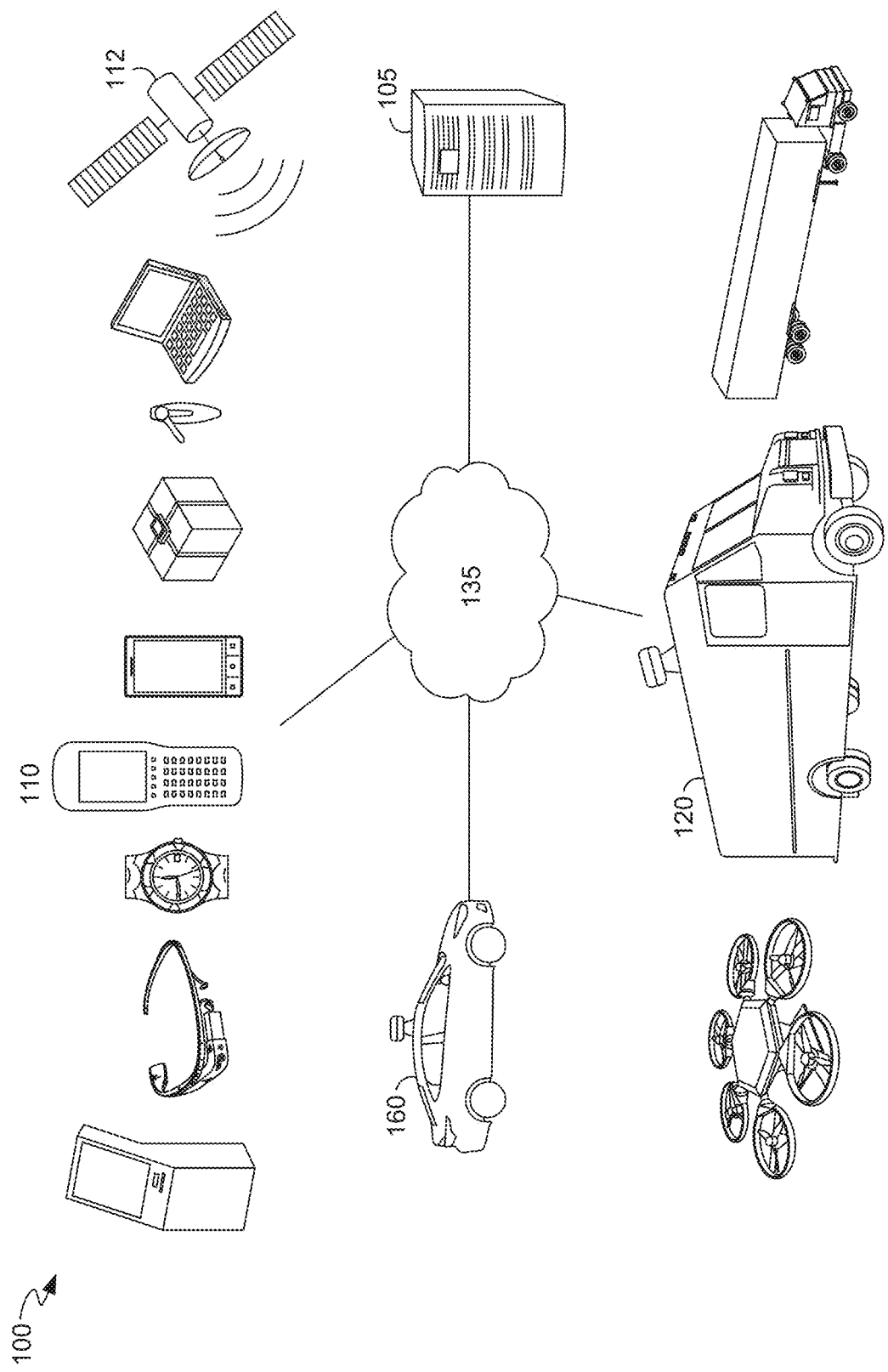

Having thus described the disclosure in general terms, reference will now be made to the accompanying drawings, which are not necessarily drawn to scale, and wherein:

FIG. 1 is a schematic diagram of an example computing environment in which aspects of the present disclosure are employed in, according to some embodiments.

Figure 2:
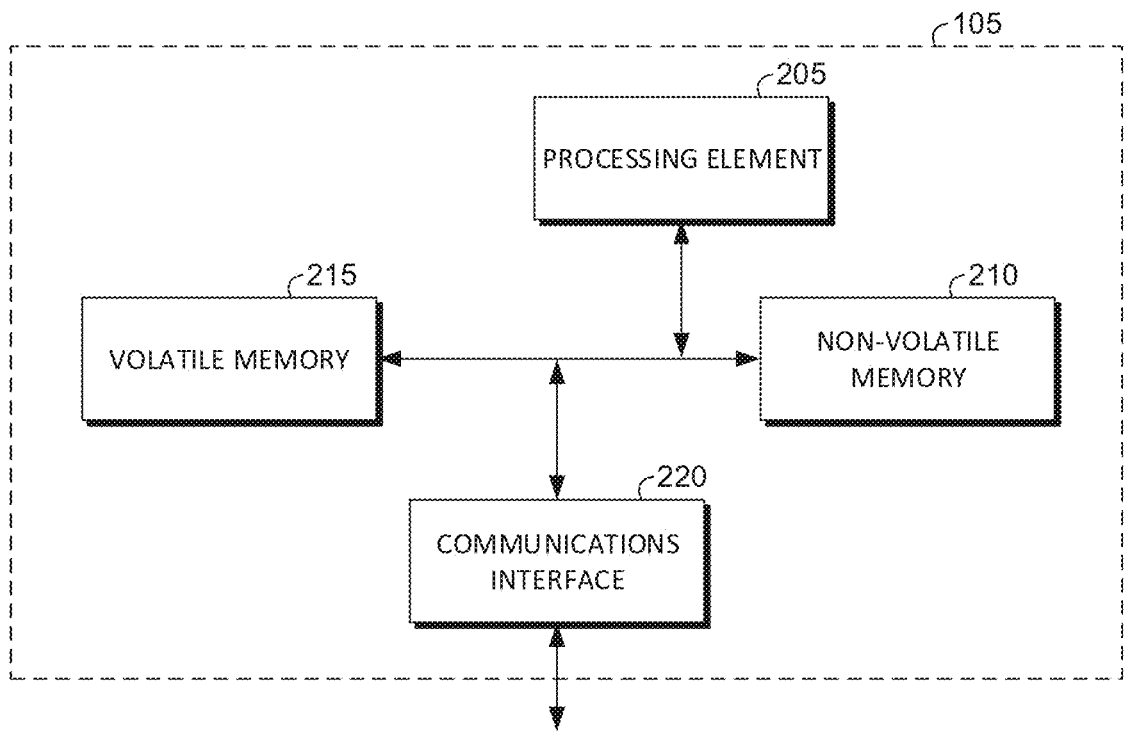

FIG. 2 is a schematic diagram of an analysis computing entity in which aspects of the present disclosure are employed in, according to some embodiments.

Figure 3:
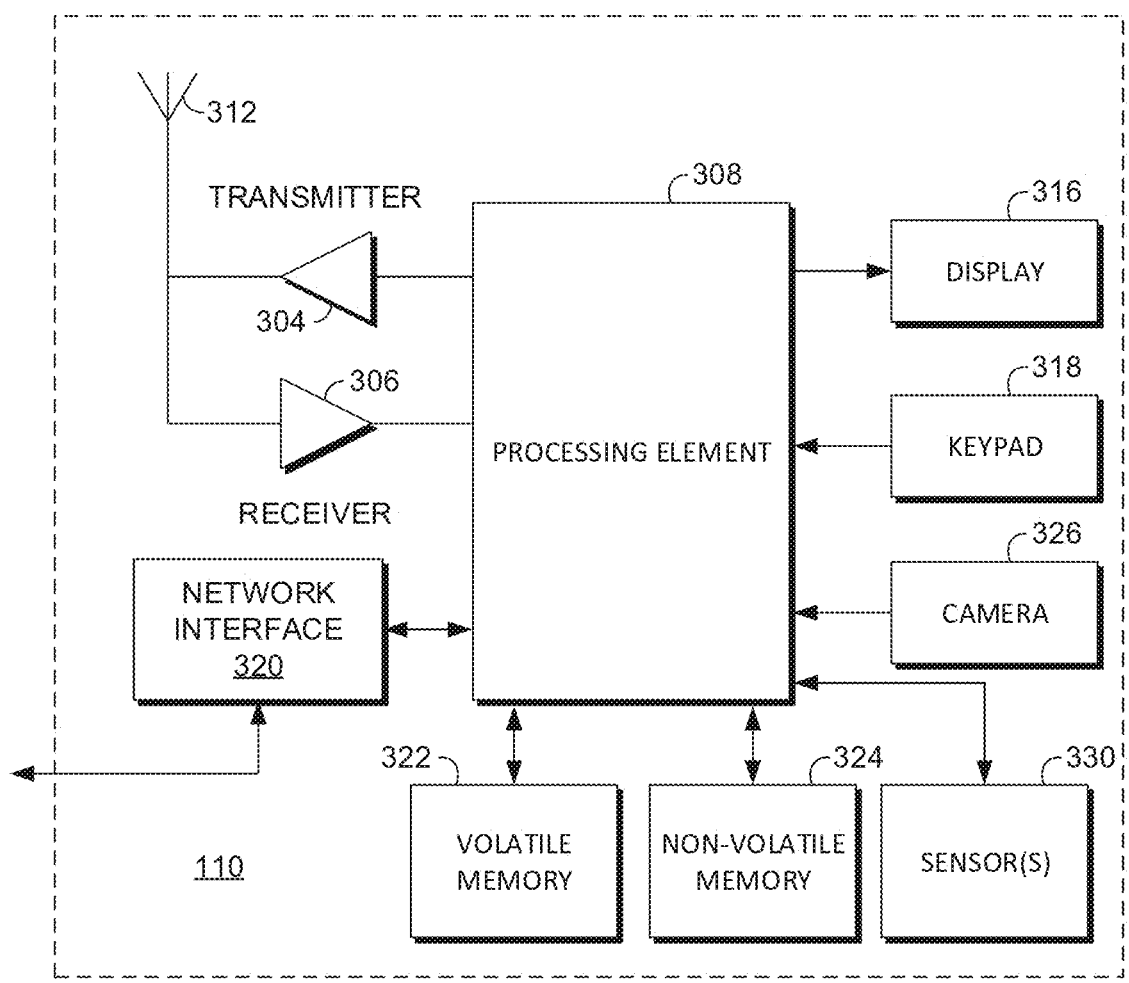

FIG. 3 is a schematic diagram of a computing entity in which aspects of the present disclosure are employed in, according to some embodiments.

Figure 4:
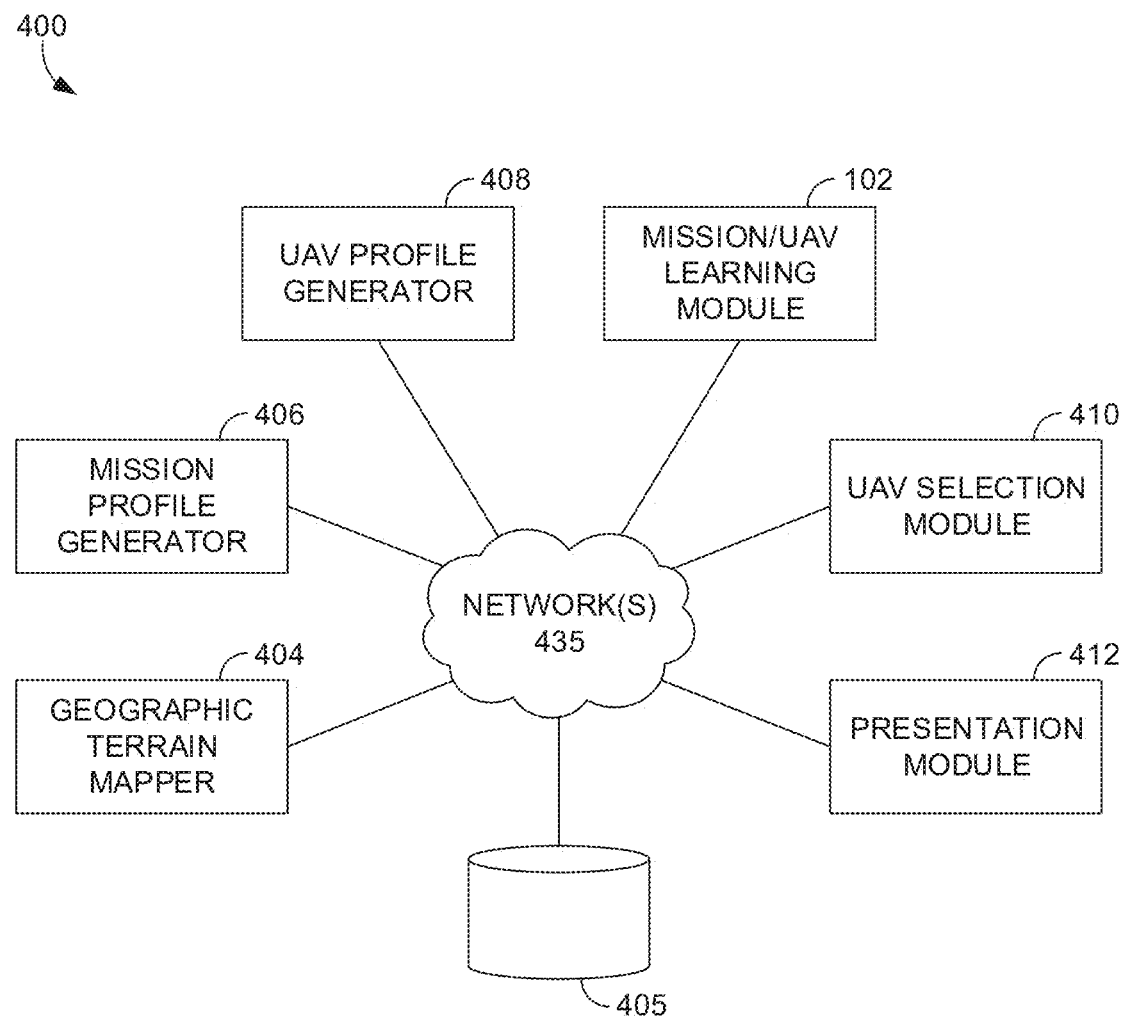

FIG. 4 is a block diagram of an illustrative system architecture in which some embodiments of the present technology may be employed.

FIG. 5 is an example table illustrating a plurality of mission profiles, according to some embodiments.

FIG. 6 is an example table illustrating a plurality of UAV profiles, according to some embodiments.

Figure 7:
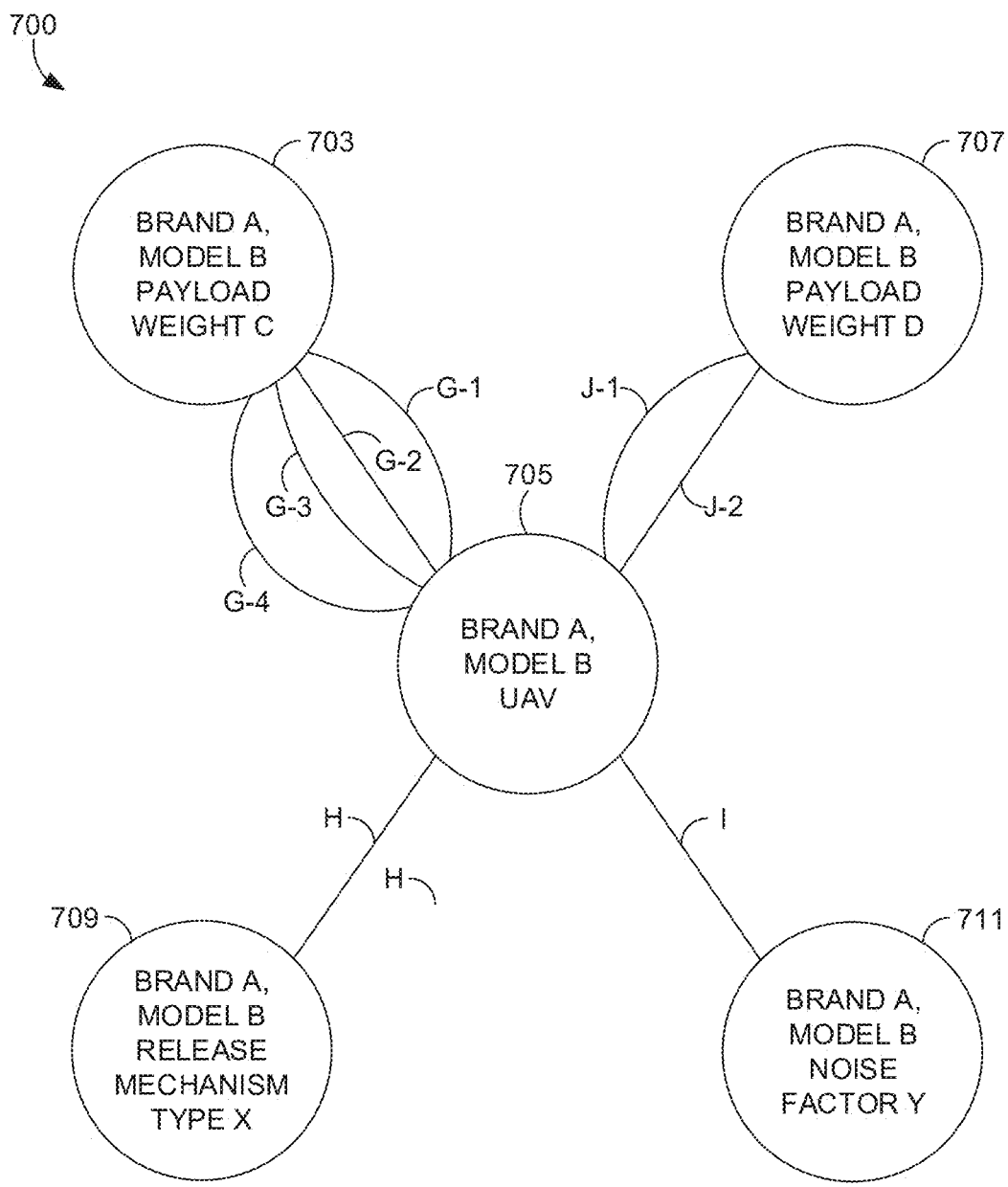

FIG. 7 is a schematic diagram of an example network graph, according to some embodiments.

Figure 8A:
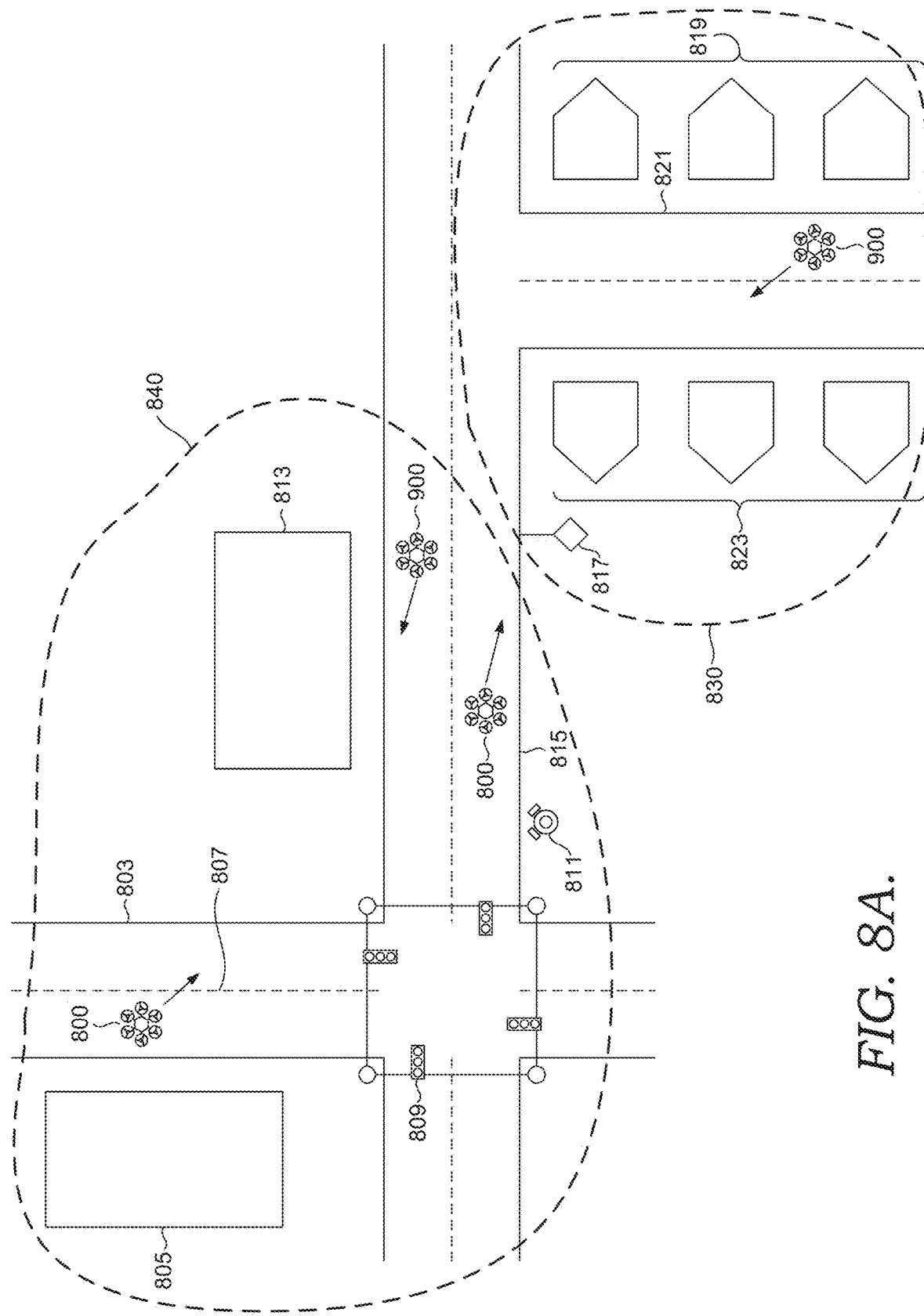

FIG. 8A is a schematic diagram of multiple geographic environments that are used for generating a mapping, according to some embodiments.

Figure 8B:
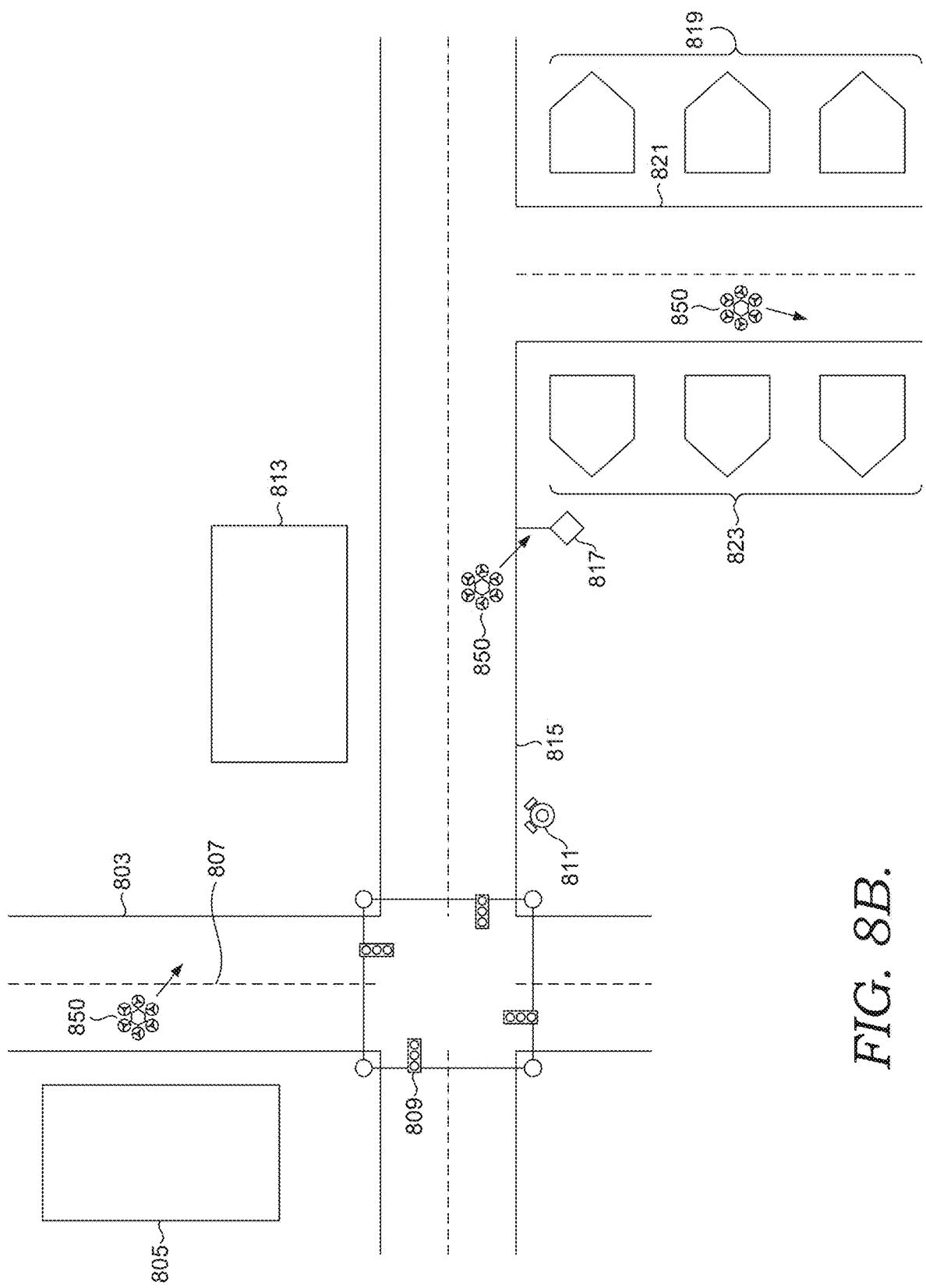

FIG. 8B is a schematic diagram of a UAV that traverses the same geographical environments of FIG. 8A for a particular mission and is selected or detects objects based at least in part on the mapping that occurred at FIG. 8A, according to some embodiments.

Figure 8C:
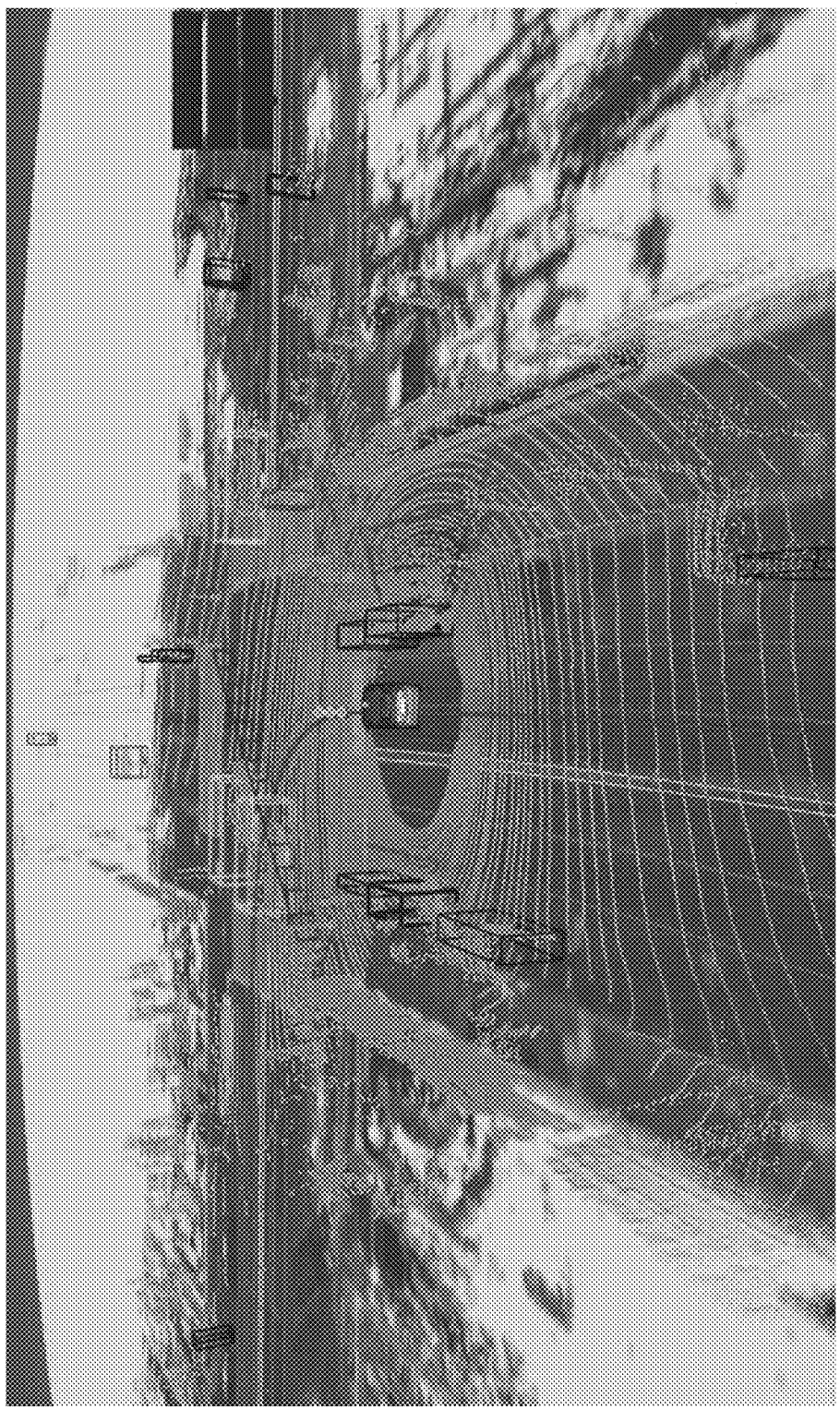

FIG. 8C illustrates an image of a generated mapping, according to some embodiments.

Figure 9:
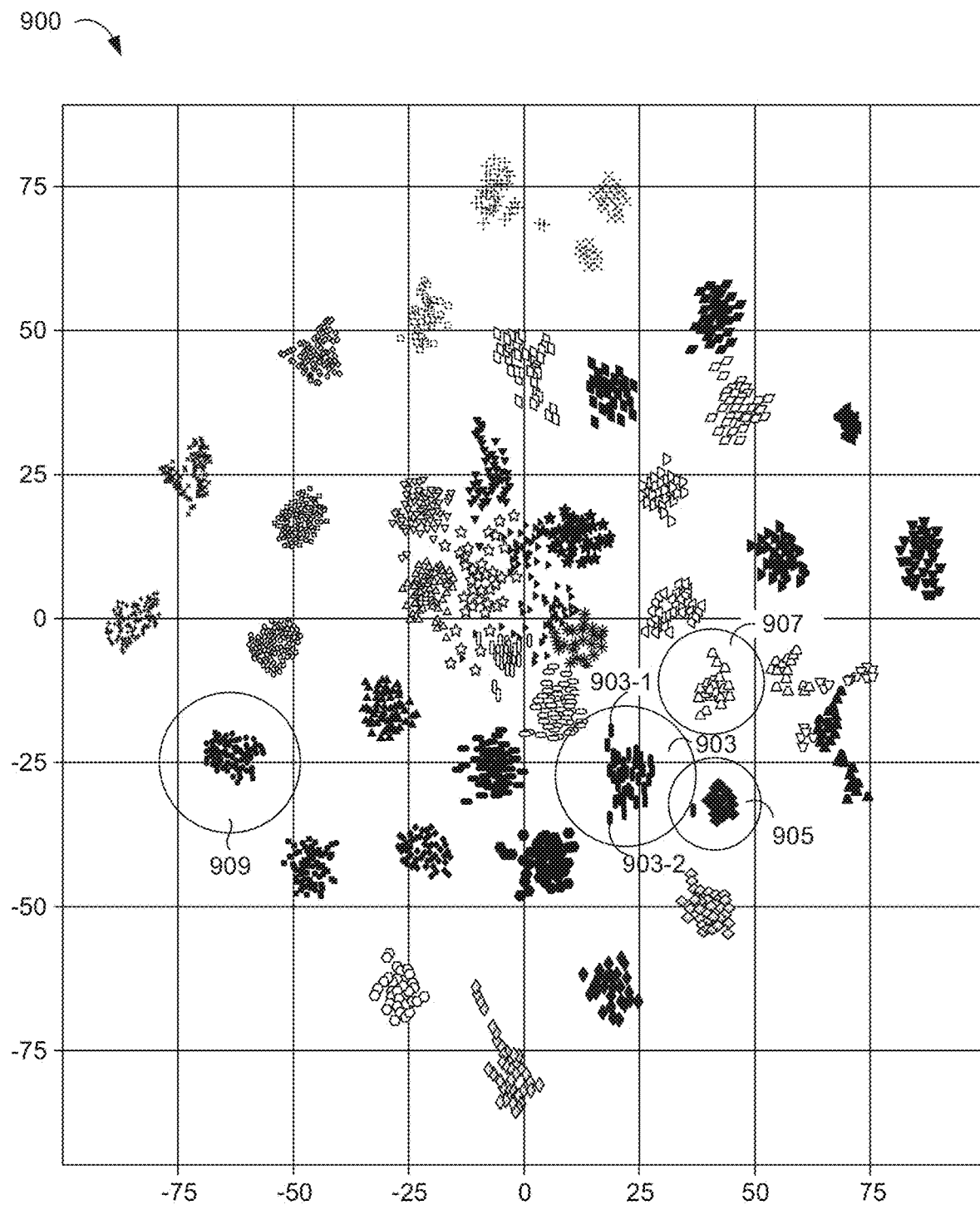

FIG. 9 is a schematic diagram of an example visualization of vector space that illustrates various feature vectors representing one or more real world objects and/or other labels, according to some embodiments.

Figure 10:
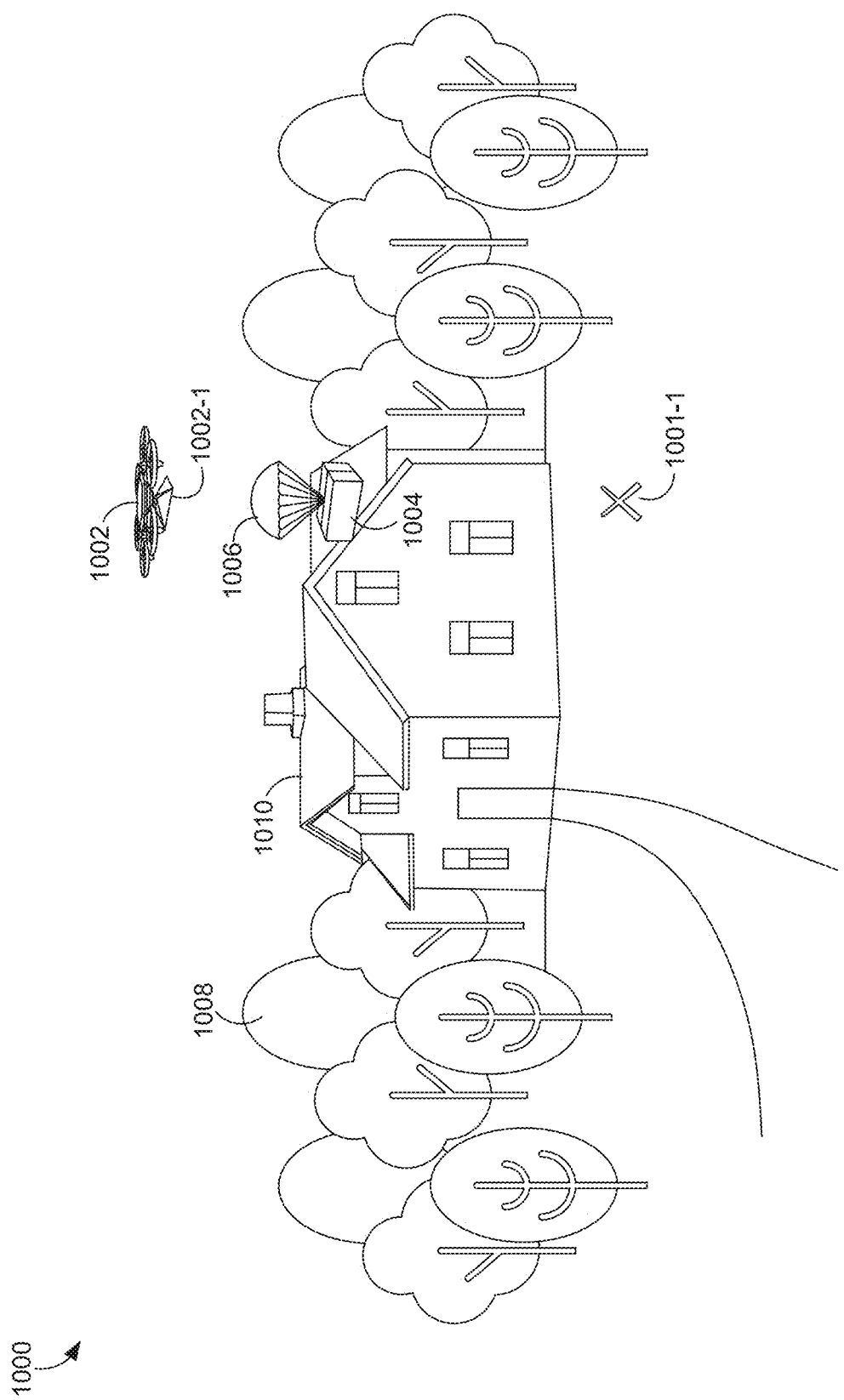

FIG. 10 is a perspective top view of a UAV within a geographical environment, illustrating how an item is deployed via a parachute release mechanism, according to some embodiments.

Figure 11:
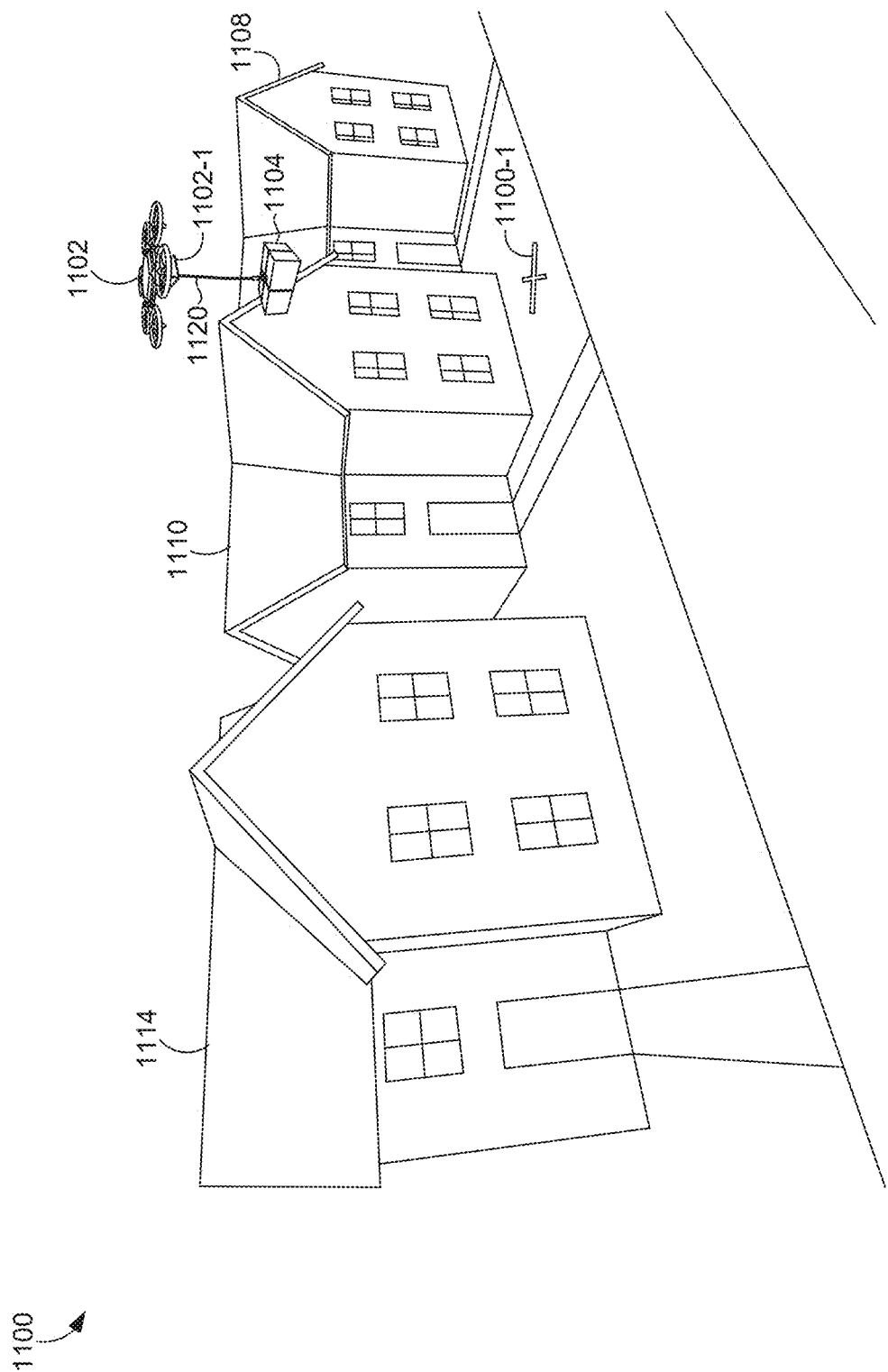

FIG. 11 is a perspective top view of a UAV within a geographical environment, illustrating how an item is deployed via a tether release mechanism, according to some embodiments.

Figure 12:
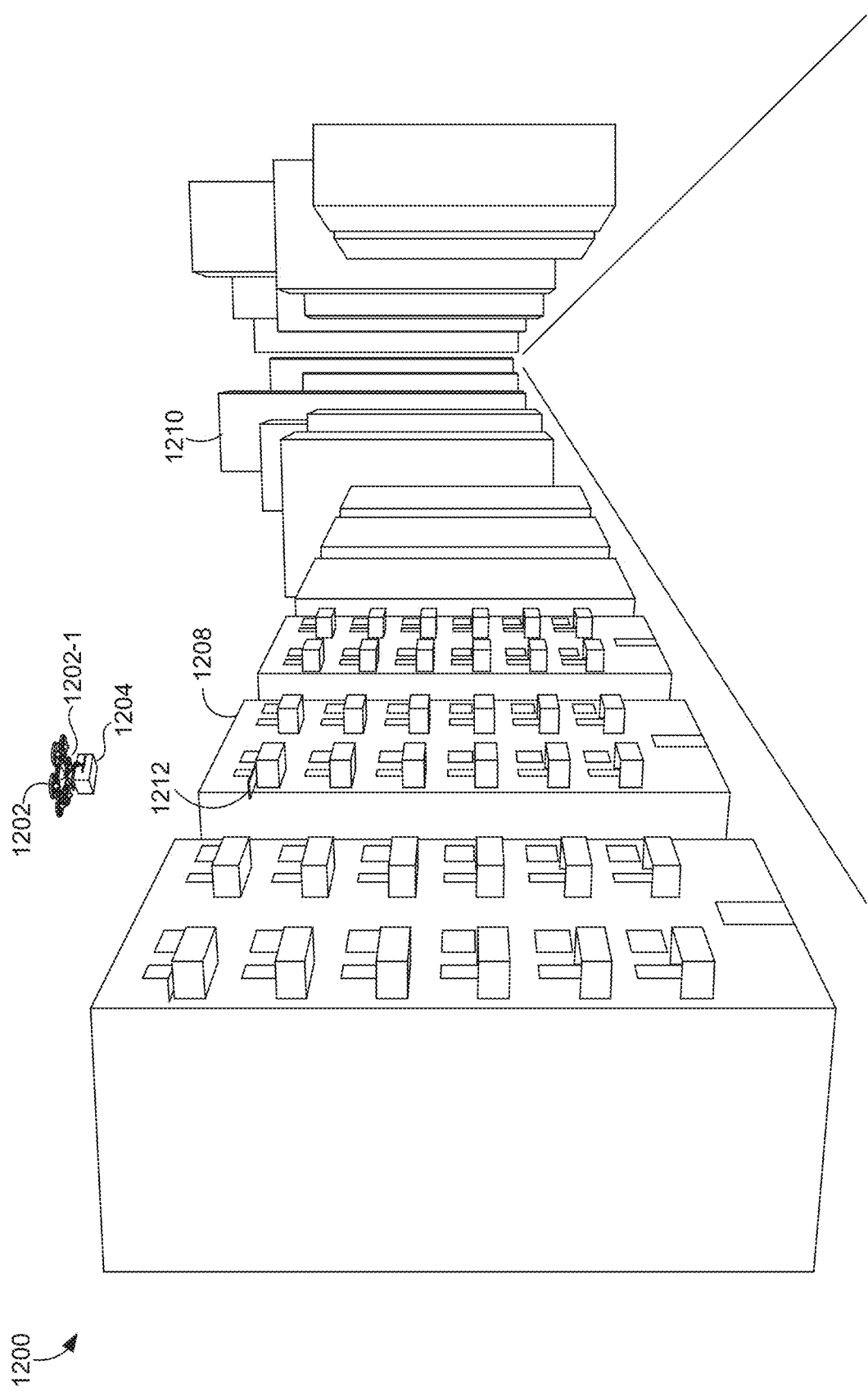

FIG. 12 is a perspective top view of a UAV within a geographical environment, illustrating how an item is deployed via a landing release mechanism, according to some embodiments.

FIG. 13 is a screenshot of an example user interface, according to some embodiments.

Figure 14:
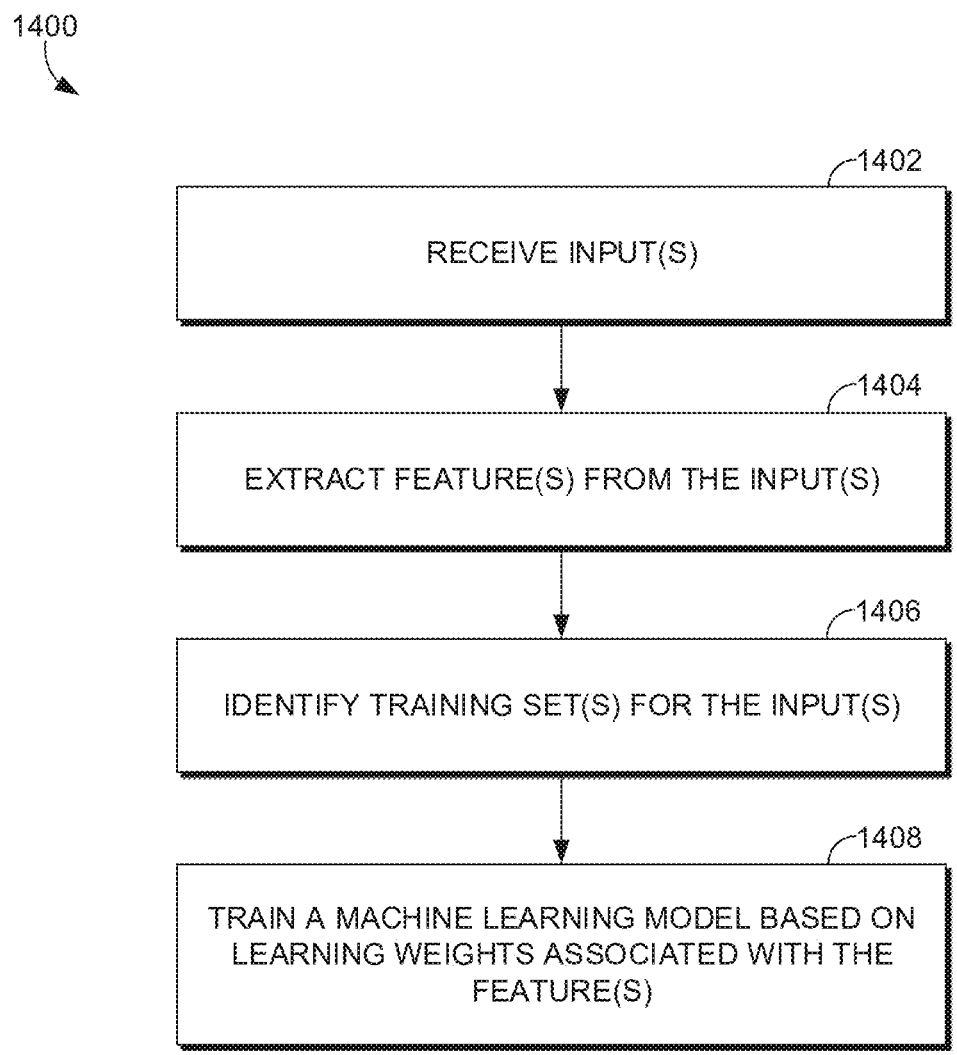

FIG. 14 is a flow diagram of an example process for training a machine learning model, according to some embodiments.

Figure 15:
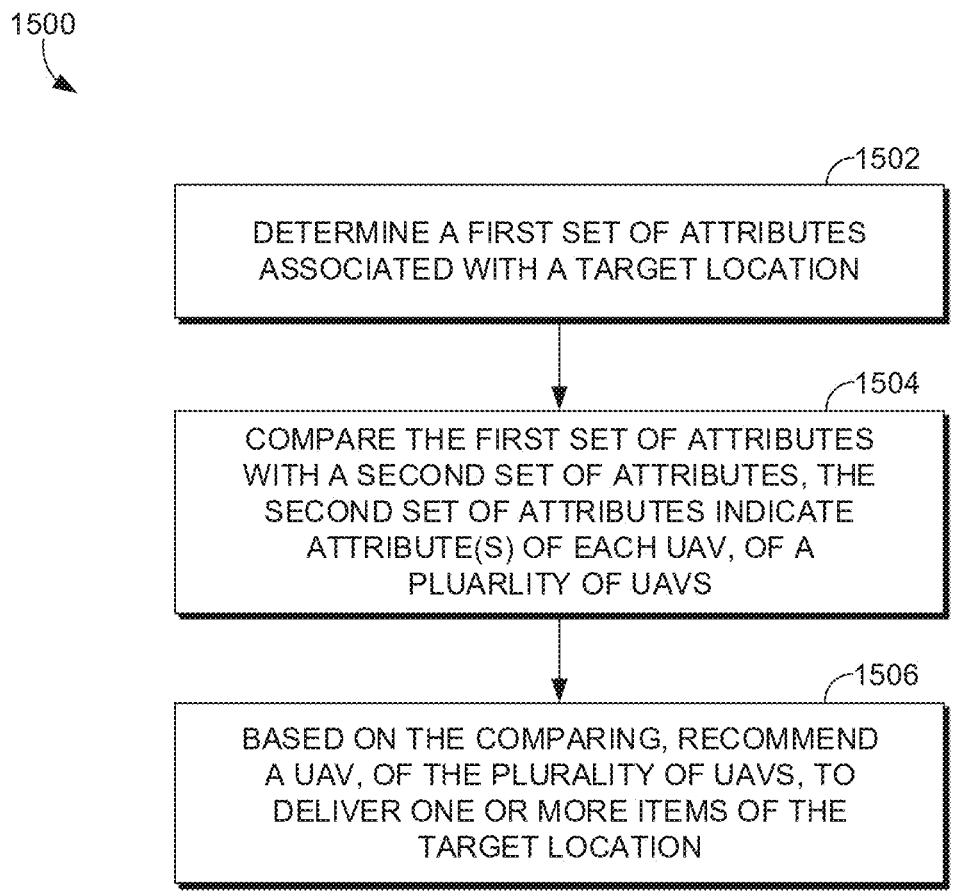

FIG. 15 is a flow diagram of an example process for recommending or selecting a UAV to deliver one or more items to a target location, according to some embodiments.

DETAILED DESCRIPTION OF THE INVENTION

The present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. Like numbers refer to like elements throughout.

I. Overview

As described above, some existing UAV technologies are not suited to deliver particular items to particular target locations. For example, a delivery may include multiple parcels that are too large for a particular UAV to carry. In another example, a certain release mechanism of a UAV may be inappropriate to use based on geographical terrain features surrounding a delivery address. However, UAVs have varying capabilities, meaning that some UAVs are suited to delivery particular items to particular target locations, while some are not. For example, certain UAVs can travel a much greater distance relative to others, certain UAVs can carry much more weight relative to others, certain UAVs can carry many more parcels than others, and some UAVs employ more suitable release mechanism types (e.g., tether release, parachute release, land release) relative to others. Accordingly, it is desirable to select the correct UAV that fits a particular mission or delivery based on certain requirements (e.g., distance) of the mission.

Although some computer applications allow users to manually select a UAV type to complete a mission or particular delivery based on certain attributes of the UAV, such functionality is arduous for users, leads to inaccuracies, and can ultimately cause destruction of UAVs themselves. For example, existing spreadsheet applications receive multiple manual user inputs that indicates a mission or delivery identification, and the UAV that is to be used for the mission. However, this is not only time consuming and arduous for users, there is human error in determining what UAV is suitable to use for a particular mission. For example, vendors typically specify that a particular UAV travels a particular distance or carries a certain quantity of weight, when in fact it does not. However, unaware of these particular discrepancies, users may still manually select, using computer applications, certain UAVs to deliver one or more items based on the inaccurate information. Such inaccuracies not only leads to failed missions or deliveries, it wastes UAV resources, such as power consumption and motor life expectancy, and causes destruction of UAVs themselves. For example, power and motor resources are unnecessarily consumed each time an incorrect UAV is sent on a mission. In an illustrative example, if a target location is a rural address surrounded by a dense forest of trees, and the release mechanism is a parachute mechanism that releases an item attached via a parachute, then the item is likely to get caught in the trees based on the unpredictability of where the parachute-attached item will land. This ultimately causes remedial actions and other unnecessary resource consumption, such as other UAVs having to re-deliver the same item or rescue the item stuck in the trees. In an example of UAV destruction, a UAV may crash by not being able to travel a particular distance to a target location.

Various embodiments of the present disclosure improve these existing UAV technologies by providing one or more solutions to the problems described above. For example, some embodiments automate the selection of UAVs based on one or more new rules or factors, which improves the user experience, causes little to no inaccuracies, and therefore leads to less consumption of UAV resources and destruction. For example, instead of the user having to arduously and manually populate a spreadsheet with a particular UAV ID and associate it with a corresponding mission based on vendor specifications, particular embodiments can automatically recommend to the user (e.g., via a user interface) or select UAVs for specific missions based on new rules or UAV/mission attributes. Such mission attributes can include, for example, a geographical area surrounding a target location, a weight of one or more items needing to be delivered, one or more dimensions of the one or more items, a flight distance from an origin location to the target location, likely weather associated with the geographical area, a time of day that the one or more items are to be delivered, and/or traffic data associated with the geographical area, and the like. Such UAV attributes can include a weight carrying capacity of a UAV, a flight distance capability of the UAV, a dimension carrying capacity of the UAV, a weather grade indicator of each UAV, a noise factor indicator of the UAV, and/or a release mechanism type of the UAV. Such new rules or attributes can alternatively or additionally include historical flight data that machine learning models use to predict certain features, such that correct UAVs are selected.

Such new rules or attributes are used to improve the accuracy of existing technologies and applications and thus UAV resource consumption. For example using the illustration above, even if a particular vendor states that a particular UAV is able to travel a particular distance, particular embodiments sample historical flight data that indicates historical deliveries of specific UAVs that have traversed over a particular geographical area. Machine learning models and other functionality can indicate whether these historical deliveries were able to travel the particular distance in order to predict whether a future UAV will successfully travel the particular distance. Accordingly, for example, even if the vendor data states that a first UAV will travel a certain quantity of miles, but historical flights indicate that the first UAV will not travel the certain quantity, the UAV is not selected as a candidate to complete the particular corresponding mission. This saves on unnecessary consumption of power, motor, and other resources and avoids UAV destruction because the UAV is not selected to complete the mission.

It is understood that although this overview section describes various improvements to conventional solutions and technologies, these are by way of example only. As such, other improvements are described below or will become evident through description of various embodiments. This overview is provided to introduce a selection of concepts in a simplified form that are further described below in the detailed description. This overview is not intended to: identify key features or essential features of the claimed subject matter, key improvements, nor is it intended to be used in isolation as an aid in determining the scope of the claimed subject matter.

II. Apparatuses, Methods, and Systems

Embodiments of the present disclosure may be implemented in various ways, including as apparatuses that comprise articles of manufacture. An apparatus may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices/entities, computing entities, and/or the like. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. Exemplary System Architecture

FIG. 1 is a schematic diagram of an example computing environment 100 in which aspects of the present disclosure are employed in, according to some embodiments. As shown in FIG. 1, this particular computing environment 100 includes one or more UAVs 120, one or more analysis computing entities 105, one or more computing entities 110 (e.g., a mobile device, such as a DIAD), one or more satellites 112, one or more networks 135, and/or the like. Each of these components, entities, devices, systems, and similar words used herein interchangeably may be in direct or indirect communication with, for example, one another over the same or different wired and/or wireless networks. Additionally, while FIG. 1 illustrates the various system entities as separate, standalone entities, the various embodiments are not limited to this particular architecture.

In various embodiments, the network(s) 135 represents or includes an IoT or IoE network, which is a network of interconnected items that are each provided with unique identifiers (e.g., UIDs) and computing logic so as to communicate or transfer data with each other or other components. Such communication can happen without requiring human-to-human or human-to-computer interaction. For example, an IoT network may include the UAV 120, which is equipped with one or more sensors and transmitter in order to process and/or transmit sensor data over the network 135 to the analysis computing entity(s) 105. In the context of an IoT network, a computer (not shown) within the UAV(s) 120 can be or include one or more local processing devices (e.g., edge nodes) that are one or more computing devices configured to store and process, over the network(s) 135, either a subset or all of the received or respective sets of data to the one or more remote computing devices (e.g., the computing entities 110 and/or the analysis computing entity(s) 105) for analysis.

In some embodiments, the local processing device(s) is a mesh or other network of microdata centers or edge nodes that process and store local data received from sensors coupled to the UAV(s) 120 and push or transmit some or all of the data to a cloud device or a corporate data center that is or is included in the one or more analysis computing entities 105. In some embodiments, the local processing device(s) store all of the data and only transmit selected (e.g., data that meets a threshold) or important data to the one or more analysis computing entities 105. Accordingly, the non-important data or the data that is in a group that does not meet a threshold is not transmitted. For example, a LIDAR, radar, and/or camera sensor located within the UAV 120 may sample map data but only push a portion of the map data. Accordingly, only after the condition or threshold has been met, do the local processing device(s) transmit the data that meets or exceeds the threshold to remote computing devices such that the remote device(s) can take responsive actions, such as notify a user mobile device (e.g., computing entity 110) indicating the threshold has been met and/or cause a modification of a device (e.g., an UAV to perform an action (e.g., deliver an item) based on a control signal received). The data that does not meet or exceed the threshold is not transmitted in particular embodiments. In various embodiments where the threshold or condition is not met, daily or other time period reports are periodically generated and transmitted from the local processing device(s) to the remote device(s) indicating all the data readings gathered and processed at the local processing device(s). In some embodiments, the one or more local processing devices act as a buffer or gateway between the network(s) and a broader network, such as the one or more networks 135. Accordingly, in these embodiments, the one or more local processing devices can be associated with one or more gateway devices that translate proprietary communication protocols into other protocols, such as internet protocols.

In various embodiments, the environment 100 is generally responsible for selecting a UAV for delivery of one or more items to one or more target locations. An "item" as described herein refers to a parcel (e.g., a package) or other container that holds a product or good (e.g., a pair of shoes) and/or the item refers to the actual product or good itself. For example, at a first time, a first set of UAVs 120 may map out, via a LIDAR or radar, a first geographical area of a first target location. The analysis computing entity(s) 105 may then receive a request to deliver a first item to the first target location The analysis computing entity(s) 105 may then compare a mission profile associated with the delivery request (e.g., which indicates the mapped out first geographical area, number of parcels to be delivered, weight of the item, flight distance, etc.) with a plurality of UAV profiles that indicate various attributes of various UAVs (e.g., weight capacity, noise factor, parcel carrying quantity capacity, release mechanism type, etc.). Based on determining that the mission profile is associated with particular attributes (e.g., being densely covered in trees) and comparing such attributes with the plurality of UAV profiles, the analysis computing entity(s) 105 can select a particular UAV to deliver the item to the first target location. In some embodiments, in response to this selection, the analysis computing entity(s) 105 can then cause display, to the computing entity 110 (e.g., a mobile phone or DIAD of a carrier worker), of one or more elements of a user interface that indicate the selection (e.g., "here are a list of UAV candidates that should be selected for this mission—please select one UAV to complete this mission."). Responsively, in some embodiments, the analysis computing entity(s) 105 receive a user selection and emit a control signal to a first UAV of the UAV(s) 20 or otherwise cause the first UAV to physically deliver the first item to the first target location.

Operating environment 100 can be utilized to implement one or more of the components of the system 400, described in FIG. 4. Operating environment 100 also can be utilized for implementing aspects of process flow 1400 and/or 1500 of FIG. 14 and FIG. 15 respectively.

1. Exemplary Analysis Computing Entities

FIG. 2 provides a schematic of an analysis computing entity 105 according to particular embodiments of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, consoles input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In particular embodiments, these functions, operations, and/or processes can be performed on data, content, information/data, and/or similar terms used herein interchangeably.

As indicated, in particular embodiments, the analysis computing entity 105 may also include one or more communications interfaces 220 for communicating with various computing entities, such as by communicating data, content, information/data, and/or similar terms used herein interchangeably that can be transmitted, received, operated on, processed, displayed, stored, and/or the like.

As shown in FIG. 2, in particular embodiments, the analysis computing entity 105 may include or be in communication with one or more processing elements 205 (also referred to as processors, processing circuitry, and/or similar terms used herein interchangeably) that communicate with other elements within the analysis computing entity 105 via a bus, for example. As will be understood, the processing element 205 may be embodied in a number of different ways. For example, the processing element 205 may be embodied as one or more complex programmable logic devices (CPLDs), microprocessors, multi-core processors, co-processing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In particular embodiments, the analysis computing entity 105 may further include or be in communication with non-volatile media (also referred to as non-volatile storage, memory, memory storage, memory circuitry and/or similar terms used herein interchangeably). In particular embodiments, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases (e.g., parcel/item/shipment database), database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity-relationship model, object model, document model, semantic model, graph model, and/or the like.

In particular embodiments, the analysis computing entity 105 may further include or be in communication with volatile media (also referred to as volatile storage, memory, memory storage, memory circuitry and/or similar terms used herein interchangeably). In particular embodiments, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the analysis computing entity 105 with the assistance of the processing element 205 and operating system.

As indicated, in particular embodiments, the analysis computing entity 105 may also include one or more communications interfaces 220 for communicating with various computing entities, such as by communicating information/data, content, information/data, and/or similar terms used herein interchangeably that can be transmitted, received, operated on, processed, displayed, stored, and/or the like. Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the analysis computing entity 105 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, long range low power (LoRa), LTE Cat M1, NarrowBand IoT (NB IoT), and/or any other wireless protocol.

Although not shown, the analysis computing entity 105 may include or be in communication with one or more input elements, such as a keyboard input, a mouse input, a touch screen/display input, motion input, movement input, audio input, pointing device input, joystick input, keypad input, and/or the like. The analysis computing entity 105 may also include or be in communication with one or more output elements (not shown), such as audio output, video output, screen/display output, motion output, movement output, and/or the like.

As will be appreciated, one or more of the analysis computing entity's 105 components may be located remotely from other analysis computing entity 105 components, such as in a distributed system. Additionally or alternatively, the analysis computing entity 105 may be represented among a plurality of analysis computing entities. For example, the analysis computing entity 105 can be or be included in a cloud computing environment, which includes a network-based, distributed/data processing system that provides one or more cloud computing services. Further, a cloud computing environment can include many computers, hundreds or thousands of them or more, disposed within one or more data centers and configured to share resources over the network(s) 135. Furthermore, one or more of the components may be combined and additional components performing functions described herein may be included in the analysis computing entity 105. Thus, the analysis computing entity 105 can be adapted to accommodate a variety of needs and circumstances. As will be recognized, these architectures and descriptions are provided for exemplary purposes only and are not limiting to the various embodiments.

2. Exemplary Computing Entities

Computing entities 110 may be configured for registering one or more users, processing one or more shipping requests, securing parcels, monitoring shipments, and/or for operation by a user (e.g., a vehicle operator, delivery personnel, customer, and/or the like). In certain embodiments, computing entities 110 may be embodied as handheld computing entities, such as mobile phones, tablets, personal digital assistants, and/or the like, that may be operated at least in part based on user input received from a user via an input mechanism. Moreover, computing entities 110 may be embodied as onboard vehicle computing entities, such as central vehicle electronic control units (ECUs), onboard multimedia system, and/or the like that may be operated at least in part based on user input. Such onboard vehicle computing entities may be configured for autonomous and/or nearly autonomous operation however, as they may be embodied as onboard control systems for autonomous or semi-autonomous vehicles, such as unmanned aerial vehicles (UAVs), robots, and/or the like. As a specific example, computing entities 110 may be utilized as onboard controllers for UAVs configured for picking-up and/or delivering packages to various locations, and accordingly such computing entities 110 may be configured to monitor various inputs (e.g., from various sensors) and generated various outputs. It should be understood that various embodiments of the present disclosure may comprise a plurality of computing entities 110 embodied in one or more forms (e.g., parcel security devices kiosks, mobile devices, watches, laptops, carrier personnel devices (e.g., Delivery Information Acquisition Devices (DIAD)), etc.)

As will be recognized, a user may be an individual, a family, a company, an organization, an entity, a department within an organization, a representative of an organization and/or person, and/or the like—whether or not associated with a carrier. In particular embodiments, a user may operate a computing entity 110 that may include one or more components that are functionally similar to those of the analysis computing entity 105. FIG. 3 provides an illustrative schematic representative of a computing entity 110 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, vehicle multimedia systems, autonomous vehicle onboard control systems, watches, glasses, key fobs, radio frequency identification (RFID) tags, ear pieces, scanners, imaging devices/cameras (e.g., part of a multi-view image capture system), wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Computing entities 110 can be operated by various parties, including carrier personnel (sorters, loaders, delivery drivers, network administrators, and/or the like). As shown in FIG. 3, the computing entity 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively. In some embodiments, the computing entity 110 includes one or more sensors 330. In this way, the computing entity 110 is a special-purpose computer or particular machine that is configured to specifically provide security for parcels. In some embodiments, at least one of the computing entities 110 is coupled to the logistics vehicle 120 (e.g., within the trunk). The one or more sensors 330 can be one or more of: a pressure sensor, an accelerometer, a gyroscope, a geolocation sensor (e.g., GPS sensor), a radar, a LIDAR, sonar, ultrasound, an object recognition camera, and any other suitable sensor used to detect objects in a geographical environment.

The signals provided to and received from the transmitter 304 and the receiver 306, respectively, may include signaling information in accordance with air interface standards of applicable wireless systems. In this regard, the computing entity 110 may be capable of operating with one or more air interface standards, communication protocols, modulation types, and access types. More particularly, the computing entity 110 may operate in accordance with any of a number of wireless communication standards and protocols, such as those described above with regard to the analysis computing entity 105. In a particular embodiment, the computing entity 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the computing entity 110 may operate in accordance with multiple wired communication standards and protocols, such as those described above with regard to the analysis computing entity 105 via a network interface 320.

Via these communication standards and protocols, the computing entity 110 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 110 can also download changes, add-ons, and updates, for instance, to its firmware, software (e.g., including executable instructions, applications, program modules), and operating system.

According to particular embodiments, the computing entity 110 may include location determining aspects, devices, modules, functionalities, and/or similar words used herein interchangeably. For example, the computing entity 110 may include outdoor positioning aspects, such as a location module adapted to acquire, for example, latitude, longitude, altitude, geocode, course, direction, heading, speed, universal time (UTC), date, and/or various other information/data. In particular embodiments, the location module can acquire information/data, sometimes known as ephemeris information/data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the computing entity's 110 position in connection with a variety of other systems, including cellular towers, Wi-Fi access points, and/or the like. Similarly, the computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices/entities (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The computing entity 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the computing entity 110 to interact with and/or cause display of information from the analysis computing entity 105, as described herein. The user input interface can comprise any of a number of devices or interfaces allowing the computing entity 110 to receive information/data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

As shown in FIG. 3, the computing entity 110 may also include an camera, imaging device, and/or similar words used herein interchangeably 326 (e.g., still-image camera, video camera, IoT enabled camera, IoT module with a low resolution camera, a wireless enabled MCU, and/or the like) configured to capture images. The computing entity 110 may be configured to capture images via the onboard camera 326, and to store those imaging devices/cameras locally, such as in the volatile memory 322 and/or non-volatile memory 324. As discussed herein, the computing entity 110 may be further configured to match the captured image data with relevant location and/or time information captured via the location determining aspects to provide contextual information/data, such as a time-stamp, date-stamp, location-stamp, and/or the like to the image data reflective of the time, date, and/or location at which the image data was captured via the camera 326. The contextual data may be stored as a portion of the image (such that a visual representation of the image data includes the contextual data) and/or may be stored as metadata (e.g., data that describes other data, such as describing a payload) associated with the image data that may be accessible to various computing entities 110.

The computing entity 110 may include other input mechanisms, such as scanners (e.g., barcode scanners), microphones, accelerometers, RFID readers, and/or the like configured to capture and store various information types for the computing entity 110. For example, a scanner may be used to capture parcel/item/shipment information/data from an item indicator disposed on a surface of a shipment or other item. In certain embodiments, the computing entity 110 may be configured to associate any captured input information/data, for example, via the onboard processing element 308. For example, scan data captured via a scanner may be associated with image data captured via the camera 326 such that the scan data is provided as contextual data associated with the image data.

The computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, information/data, applications, programs, program modules, scripts, source code, object code, byte code, compiled code, interpreted code, machine code, executable instructions, and/or the like to implement the functions of the computing entity 110. As indicated, this may include a user application that is resident on the entity or accessible through a browser or other user interface for communicating with the analysis computing entity 105 and/or various other computing entities.

In another embodiment, the computing entity 110 may include one or more components or functionality that are the same or similar to those of the analysis computing entity 105, as described in greater detail above. As will be recognized, these architectures and descriptions are provided for exemplary purposes only and are not limiting to the various embodiments.

FIG. 4 is a block diagram of an illustrative system architecture 400 in which some embodiments of the present technology may be employed. Although the system 400 is illustrated as including specific component types associated with a particular quantity, it is understood that alternatively or additionally other component types may exist at any particular quantity. In some embodiments, one or more components may also be combined. It is also understood that each component or module can be located on the same or different host computing devices. For example, in some embodiments, some or each of the components within the search engine system 400 are distributed across a cloud computing system, such as the operating environment 100. In other embodiments, the system 400 is located at a single host or computing device, such as an analysis computing entity 105 of FIG. 1. In some embodiments, the system 400 illustrates executable program code such that all of the illustrated components and data structures are linked in preparation to be executed at run-time.

System 400 is not intended to be limiting and represents only one example of a suitable computing system architecture. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location. For instance, the functionality of system 400 may be provided via a software as a service (SAAS) model, e.g., a cloud and/or web-based service. In other embodiments, the functionalities of system 400 may be implemented via a client/server architecture.

The system 400 is generally directed to selecting a UAV to deliver one or more items to a particular target location. The system 400 includes the mission learning module 402, the geographic terrain mapper, the mission profile generator 406, the drone profile generator 408, the UAV selection module 410, and the presentation module 412, each of which are communicatively coupled to the network(s) 435. In some embodiments, the network(s) 435 represents or is included in the network(s) 135 of FIG. 1.

The geographic terrain mapper 404 is generally responsible for detecting objects in a geographical area associated with a target location or mapping a geographical area associated with a target location. In some embodiments, the geographic terrain mapper 404 is or uses a Convolutional Neural Network (CNN) to recognize one or more input images of a geographical area or uses object detection functionality to detect objects in one or more input images of a geographical area.

In an illustrative example of object detection functionality, particular embodiments use one or more machine learning models (e.g., a Convolutional Neural Network (CNN)) to generate a bounding box that defines the boundaries and encompasses a computer object representing a feature (e.g., a mountain, set of trees, a building, etc.) of a geographical area. These machine learning models can also generate a classification prediction that the computer object is a particular feature. In computer vision applications, the output of object detection can be encompassed by a bounding box. A bounding box describes or defines the boundaries of the object in terms of the position (e.g., 2-D or 3-D coordinates) of the bounding box (and also the height and width of the bounding box). For example, the bounding box can be a rectangular box that is determined by its x and y axis coordinates. This gives object recognition systems indicators of the spatial distinction between objects to help detect the objects.

In some embodiments, one or more machine learning models can be used and trained to generate tighter bounding boxes for each object. In this way, bounding boxes can change in shape and confidence levels for classification/prediction can be increased based on increased training sessions. For example, the output of a Convolutional Neural Network (CNN) or any other machine learning model described herein can be one or more bounding boxes over each feature of an image (corresponding to a feature in a real-world geographical area), where each bounding box includes the classification prediction (e.g., this object is a building) and the confidence level (e.g., 90% probability).

Object detection or other machine learning model prediction using images can occur in any suitable environment. For example, various UAVs can be equipped with object detection cameras, where images of geographical areas can continuously be streamed to memory during individual UAV missions (e.g., delivery of items), such that the geographic terrain mapper 404 can determine, classify, or otherwise generate a decision statistic of each object within an image captured by the UAV. In this way, the geographic terrain mapper 404 can learn the terrain or physical landscape of a particular geographical area surrounding, for example, a target location so that the UAV selection model 410 can select the appropriate UAV, as described in more detail below.

In an example illustration of how machine learning models can be used to classify images or objects within images, one or more neural networks (e.g., CNNs) can be used. In some embodiments, various categories or labels can first be identified and run through training, such as images that contain "trees," "buildings," or "roads." The neural network can include a convolutional layer, a pooling layer, and a fully connected layer. The machine learning model neural network may be fed or receive as input one or more images of geographical areas at the convolutional layer. Each input image can be transformed into a 2-D input vector array of values, such as integers of ones and zeroes. Each value represents or describes a particular pixel of the image and the pixel's intensity. For instance, each line or edge of a street in the image can be denoted with a one and each non-line can be represented with zeroes. The convolutional layer utilizes one or more filter maps, which each represent a feature (e.g., a sub-image) of the input image (e.g., a building, tree, mountain, or other feature within the larger geographical area). There may be various features of an image and thus there may be various linearly stacked filter maps for a given image. A filter map is also an array of values that represent sets of pixels and weights where a value is weighted higher when it matches a corresponding pixel or set of pixels in the corresponding section of the input image. The convolution layer includes an algorithm that uses each filter map to scan or analyze each portion of the input image. Accordingly, each pixel of each filter map is compared and matched up against a corresponding pixel in each section of the input image and weighted according to similarity. In some embodiments, the convolutional layer performs linear functions or operations to arrive at the filter map by multiplying each image pixel value with its own value and then performing a summation function of each product, which is then divided by the total quantity of pixels in the image feature.

In particular embodiments, the pooling layer reduces the dimensionality or compresses each feature map by picking a window size (i.e., a quantity of dimensional pixels that will be analyzed in the feature map) and selecting the maximum value of all of the values in the feature map as the only output for the modified feature map. In some embodiments, the fully connected layer maps votes for each pixel of each modified feature to each classification or label (e.g., whether the feature is a "tree" or "mountain," etc.). The vote strength of each pixel is based on its weight or value score. The output is a score (e.g., a floating point value, where 1 is a 100% match) that indicates the probability that a given input image or set of modified features fits within a particular defined class (e.g., "tree," "mountain," or "road"). After the first picture is fed through each of the layers, the output may include a floating point value score for each classification type that indicates "building: 0.21," "bush: 0.70," and "tree: 0.90," which indicates that the particular feature within the image is a tree, given the 90% likelihood. Training or tuning can include minimizing a loss function between the target variable or output (e.g., 0.90) and the expected output (e.g., 100%). Accordingly, it may be desirable to arrive as close to 100% confidence of a particular classification as possible so as to reduce the prediction error. This may happen overtime as more training images and baseline data sets are fed into the learning models so that classification can occur with higher prediction probabilities.

In some embodiments, the geographic terrain mapper 404 alternatively or additionally is or uses various sensors (e.g., a radar, LIDAR, etc.) to map out a geographical area associated with a target location. For example, the mapping can include a HD map that includes a real-time layer, a map priors layer, a semantic map layer, a geometric map layer, and a base map layer. In some embodiments, various UAVs can be equipped with radar, LIDAR, or cameras where these sensor outputs can continuously be streamed to memory, such that the geographic terrain mapper 404 can receive a map of the geographical area. In this way, the geographic terrain mapper 404 can determine the terrain or physical landscape of a particular geographical area surrounding, for example, a target location so that the UAV selection model 410 can select the appropriate UAV, as described in more detail below.

In some embodiments, the geographic terrain mapper 404 alternatively or additionally uses one or more predefined maps (e.g., GOOGLE maps) to determine the geographic terrain of a particular area (e.g., by performing object detection on the predefined maps) associated with a target location. In some embodiments, the geographic terrain mapper 404 alternatively or additionally processing natural language descriptions (via Natural Language Processing ("NLP")) of a particular area to determine the geographic terrain of a particular area associated with the target location.

The mission profile generator 406 is generally responsible for generating one or more mission profiles. A "mission profile" as described herein refers to one or more attributes and values of a particular request to deliver one or more specific items to one or more specific target locations. A "target location" as described herein refers to a location that one or more items are to be delivered to. For example, a target location can be a home address or place of business address, a particular area associated with an address (e.g., a porch, backyard, fence, etc.), geo-coordinates (e.g., GPS latitude and longitude coordinates), a geo-fence, a zip code, a neighborhood, and the like. A "geo-fence" refers to a virtual perimeter that surrounds a real-world geographical area. Geo-fence perimeters can be defined by streets, geographical objects (e.g., a line of trees, a mountain, a river, a lake, etc.), state, county, or city lines, which surround the target location.

In an illustrative of example of a mission profile, a user may request that a first item be delivered to a first home address. In response to this request, a mission profile indicating various attributes of the delivery of the first item to the first home address may be generated and stored in computer memory. For example, the mission profile may include attributes of: the weight and dimensions (e.g., length, width, and/or height) of the first item, the distance needing to be traveled from an origin (e.g., a sorting center where UAVs are deployed to deliver parcels) to the first home address, the name of the user, the time of day the first item is to be delivered, likely weather at the time of delivery at the first home address, traffic data associated with the geographical area, and the like.

The UAV profile generator 408 is generally responsible for generating one or more UAV profiles. A "UAV profile" as described herein refers to one or more attributes and values of a particular UAV. For example, a UAV profile may include attributes of: a weight carrying capacity of a first UAV, one or more dimension carrying capacities of the first UAV (e.g., the widest or longest parcel that the first UAV can carry), a flight distance capability of the first UAV, a release mechanism type of the first UAV, a weather grade indicator of the first UAV (e.g., indicating whether it is suited for snow, rain, or the like), a battery profile (e.g., # of charge cycles, age, mAh, performance attributes), as attributes of the battery could impact the performance/capabilities of the UAV, cost of operation or mission (e.g., in terms of fuel or money), certifications and regulatory/legal compliance requirements for the UAV, a noise profile indicating a noise level (e.g., in dB) a UAV is, an identity of the manufacturer and the owner of the UAV, and/or the like.

For third party owned UAVs, the UAV profile can include the total monthly invoiced amounts (e.g., in dollars) as criteria to spread out operational and financial risks. For example, if there is a possibility of using the same UAV model from three different partners, some embodiments manage which one of the three gets the mission allocated based on how many other missions were given to them this month. If one of the three seldom gets a mission, they may lose interest or a logistics entity may be charged on a different pricing tier. The UAV profile may also include indications of whether UAVs (e.g., third party UAVs) are branded (e.g., have particular logistics entity logos and/or colors) or are generic, whether the UAVs are certified for healthcare use or only general transport, the identity or type of sensors the UAVs employ (e.g., cameras, radar, etc.), whether the UAVs can fly Beyond Visual Line of Sight (BVLOS), The mission/UAV learning module 402 is generally responsible for learning and weighting one or more features associated with a target location and/or a particular UAV. Various embodiments input various historical flight data (e.g., various mission profile attributes and various UGV profile attributes of historical deliveries) as training data so that a decision statistic is generated for future or current deliveries or missions. A "decision statistic" as described herein refers to any suitable prediction output, such as a classification prediction (e.g., a target location is likely to experience "rain" at the time of delivery), regression probability, or clustering prediction (e.g., an input feature likely belongs to a particular cluster). Embodiments can learn the parameters of the machine learning model so that similar mission profile or UAV profile attributes are closer to each other in feature space. In some embodiments, this training is done in a supervised manner using Cross entropy loss function (e.g., when number of class are not huge) or other clustering based loss function (e.g. Triplet loss or GE2E loss) that try to map similar mission profiles or UAVs into one cluster.

Once the model is trained, embodiments can represent a target location and/or UAV in feature space by aggregating (e.g. mean/median or dot product) the features by passing these them through the trained model. For example, in supervised learning contexts, the mission/UAV learning module 402 can receive a mission profile that includes a specific geographic-UAV label indicative of a geographical area that a target location is in and the corresponding UAV ID used. Embodiments can then run the profiles with the corresponding labels through a machine learning model so that different feature values are learned according to the label. For example, using the illustration above, it can be learned, via training, that for a first geographical area (e.g., zip code, address, geofence, etc.), a first UAV type made 42 historical deliveries within the first geographical area and that the heaviest item delivered by the first UAV was 20 pounds, the longest distance the UAV traversed was 200 miles, and that all deliveries were "successful." In this way, for example, when a future delivery request is made to deliver an item using the same first UAV, the 20 pounds attribute value included in the corresponding UAV profile (indicative of the maximum weight that can be carried). This weight attribute can then be compared against the weight identifier in the mission profile that indicates the weight of the item needing to be delivered so that that a suitable UAV can be selected where the weight carrying capability meets the weight of the items needing to be delivered.

In some embodiments, the mission/UAV learning module 402 learns features of the mission and/or UAV profile and responsively weights them during training. A "weight" in various instances represents the importance or significant of a feature or feature value for classification or other decision statistic. For example, each feature may be associated with an integer or other real number where the higher the real number, the more significant the feature is for its label or classification. In some embodiments, a weight in a neural network or other machine learning application can represent the strength of a connection between nodes or neurons from one layer (an input) to the next layer (an output). A weight of 0 may mean that the input will not change the output, whereas a weight higher than 0 changes the output. The higher the value of the input or the closer the value is to 1, the more the output will change or increase. Likewise, there can be negative weights. Negative weights proportionately reduce the value of the output. For instance, the more the value of the input increases, the more the value of the output decreases. Negative weights may contribute to negative scores, which are described in more detail below. In many instances, only a selected set of features are primarily responsible for a determination of whether a particular predetermined image style belongs to a certain label.

In another illustrative example of the mission/UAV learning module 402, some embodiments learn an embedding (or feature space or vector space) of feature vectors based on deep learning to detect similar features or attribute data using distance measures, such as cosine or Euclidian distance. For example, each mission profile is converted from string or other form into a vector (e.g., a set of real numbers) where each value or set of values represents the individual feature values of the profiles or attributes in feature space. For example, a first feature vector representing a particular first mission can be oriented in feature space or have values based on the weight of the items being delivered for the first mission (a first feature), the dimensions of the items (second feature), the flight distance from an origin to the target location for the item (a third feature). Feature vectors need not represent individual mission profiles but can represent any feature therein, where other features are inputted into the feature vector. For example, each feature vector can represent an individual UAV, where each value or set of values represents particular historical features of the UAV, such as the most weight the UAV has carried, the farthest distance it has travelled, the types of weather it has traversed, and the like. Likewise, the feature vector can represent an individual target location, where each value or set of values represent historical features of the target location.

Feature space (or vector space) is a collection of feature vectors that are each oriented or embedded in space based on an aggregate similarity of features of the feature vector. Over various training stages or epochs, certain feature characteristics for each profile or attribute can be learned or weighted. For example, for a first UAV profile (e.g., a certain category or type of UAV), the most prominent feature may be a historical pattern of carrying between 50 and 60 pounds of cargo, whereas other features change considerably or are not present, such as the number of parcels delivered over several historical deliveries. Consequently, the 50-60 pound weight pattern can be weighted (e.g., a node connection is strengthened to a value close to 1), which is indicative of the particular UAV being able to carry items that weigh up to 60 pounds. In this way, embodiments learn weights corresponding to different features such that important features found in similar inputs and from the same family or contribute positively and features that can change even for the same label or attribute contribute negatively.

The UAV selection module 410 is generally responsible for selecting or recommending a suitable UAV to carry out a mission based at least in part on the functionality performed by the geographic terrain mapper 404, the mission profile generator 406, the UAV profile generator 408, and/or the mission/UAV learning module 402. In this way, the UAV selection module 410 can programmatically call or link to the geographic terrain mapper 404, the mission profile generator 406, the UAV profile generator 408, and/or the mission/UAV learning module 402 to make a selection of an appropriate UAV. The UAV selection module 410 can thus select a drone from a pool of UAVs with different profiles. In some embodiments, the UAV selection module 410 takes into account the maintenance logs of each UAV as well as flight hours logged, and uses that information to balance out usage among UAVs with similar profiles since the same drone is not always used, but their use is often rotated their so that the fleet ages in sync. Some embodiments also sync up with a preventive maintenance module that foresees what components need to be maintained and when, and plans usage to ensure not all drones in the same profile category are scheduled to go into maintenance simultaneously. Some embodiments also ensure keeping a number of UAVs for each profile available for missions (not on scheduled maintenance), based on the historical trends of usage per profile type (historical resource needs per UAV type). Some embodiments include a weather forecasting module to determine weather since weather may also impact the type of UAV selected. Some UAVs may behave better in adverse weather conditions, or may have a different tolerance and limitations as to what weather they can fly in, which is described in more detail below.

In an illustrative example of the UAV selection module 410, the geographic terrain mapper 404 may detect that a first target location is an urban residential address that is surrounded by multiple skyscrapers. The geographic terrain mapper 404 may determine that there is a landing pad for a UAV. Accordingly, the UAV selection module 410 may select a first UAV that has a release mechanism type that is configured to precisely drop of an item onto the landing pad (and refrain from selecting other UAVs that are less suitable or have less precise release mechanisms (e.g., a parachute release mechanism). Using the same illustration, the mission profile generator 406 may determine that the first target location is only 10 miles away from a UAV launching point and that the first UAV is capable for travelling more than 100 miles for a particular mission, as determined by the UAV profile generator 408 and the mission/UAV learning module 402. Therefore, the UAV selection module 410 may further generate weights or increment a score to provide a higher confidence that the first UAV is suitable for the particular mission to deliver to the first target location.

In some embodiments, the UAV selection module 410 generates a score (e.g., an integer value) for each factor determined by the geographic terrain mapper 404, mission profile generator 406, the UAV profile generator 408, and/or the mission/UAV learning module 402 and makes a selection based on this score. Such scores act as an indication to weight the selection of a particular UAV for a particular mission or target location. This contemplates situations where a particular UAV can be a candidate for a particular mission/target location, even though it is not the most favored candidate for the particular mission target/location. In these embodiments, certain factors are more important than others for completing a mission or delivering to a particular target location. Accordingly, certain factors will carry more weight in making the determination of whether a particular UAV is selected. For example, the geographic terrain mapper 404 may detect a first terrain type that a first release mechanism type of a first UAV is more suitable to use relative to a second release mechanism type of a second UAV. Accordingly, embodiments can score the first UAV with an integer of 4 and the second UAV with an integer of 2 for the feature of release mechanism type. However, for a distance capability feature, the UAV profile of the first UAV may indicate that the first UAV is not capable of travelling the distance to the target location. However, the UAV profile of the second UAV may indicate that the second UAV is capable of travelling the distance to the target location. Accordingly, the UAV selection module 410 may score the second UAV with a value of 10, whereas the first UAV is scored with a value of 2 for the distance capability feature. Various embodiments then aggregate (e.g., sum, or multiply) these scores. Where summation is used, the total score for the first UAV in this example is 6 (4+2) and the total score for the second UAV is 12 (2+10). Accordingly, the UAV selection module 410 may select the second UAV based on the aggregate score being higher relative to the first UAV. In some embodiments, there are minimum threshold requirements that must be met to be considered a candidate for a particular mission. For example, with respect to the summation example described above, the total integer score (or individual score in a particular category) may need to meet a threshold integer value, such as 7. In this case, the first UAV would not be considered as a candidate and have no chance of being selected since its total score was 6. Alternatively, in some embodiments, each UAV is always selected as a candidate for a particular mission first (regardless of their scores). Subsequently, the scores are compared in order to select the best or most suitable candidate based on particular candidates' score.

In some embodiments, the UAV selection module 410 sends a control signal to the selected UAV to cause the UAV to deliver the one or more items to the target location. In these embodiments, the selection module 410 can transmit, via a transmitter, the control signal over a computer network, to a receiver at the UAV. Such control signal can include a computer-readable instruction for the UAV to be alerted (e.g., via audible or visual (e.g., light emission)) in order for loading operators to load the UAV with corresponding items for a mission. Alternatively or additionally, such control signal can include a computer-readable instruction that directly causes the UAV to fly or otherwise move (e.g., to clasp particular items at a particular location, to deliver items already within the UAV to a particular target location, and/or to move to a particular location where loading personnel is so that corresponding items can be loaded into the UAV). In this way, each of these examples, "cause" the UVA to deliver the one or more items to the target location.

The system 400 also includes a presentation module 412 that is generally responsible for causing presentation of content and related information to user devices, such as a selected UAV or other information based on functionality performed by the geographic terrain mapper 404, the mission profile generator 406, the UAV profile generator 408, the mission/UAV learning module 402, and/or the UAV selection module 410. The presentation module 412 may comprise one or more applications or services on a user device, across multiple user devices, or in the cloud. For example, in one embodiment, presentation module 412 manages the presentation of content to a user across multiple user devices associated with that user. Based on content logic, device features, associated logical hubs, inferred logical location of the user, and/or other user data, presentation component may determine on which user device(s) content is presented, as well as the context of the presentation, such as how (or in what format and how much content, which can be dependent on the user device or context) it is presented and/or when it is presented.

In some embodiments, the presentation module 412 generates user interface features. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. In some embodiments, the presentation module 412 generates structured data, tagged data or otherwise causes presentation of structured or tagged data that was previously unstructured, semi-structured, or untagged. In some embodiments, the presentation module 412 generates the same or similar elements, as described with respect to FIG. 13.

Example system 400 also includes storage 405. Storage 405 generally stores information including data, computer instructions (e.g., software program instructions, routines, or services), data structures (e.g., network graphs, NLP libraries, hash maps), training data, and/or models used in embodiments of the technologies described herein. Some embodiments of storage 405 may have stored thereon computer logic comprising the rules, conditions, associations, classification models, and other criteria to execute the functionality of any of the components, modules, analyzers, generators, and/or engines of system 400.

FIG. 5 is an example table 500 illustrating a plurality of mission profiles, according to some embodiments. In some embodiments, the table 500 is what is generated or analyzed by the mission profile generator 406 (e.g., to determine a selection of a UAV via the UAV selection module 410). In some embodiments, other components, such as the geographic terrain mapper 404 and/or the mission/UAV learning module 402 alternatively or additionally causes information to be populated in the table 500 (e.g., via programmatically calling the mission profile generator 406), which is described in more detail below. In some embodiments, the table 500 represents a data structure, such as a hash table, a lookup table, a database table, or the like that is stored in computer memory.

The table 500 includes various attributes, such as the mission profile ID, an "item weight" attribute, a "item dimension(s)" attribute, a "flight distance" attribute, a "time of mission" attribute, a "number of items" attribute, a "target location coordinates" attribute, a "target location type" attribute, a "weather probability" attribute, and a "traffic data" attribute.

The "mission profile ID" attributes includes an identifier that identifies a particular mission or delivery of item(s) to a particular target location. Such identifiers correspond to entries or records, such as the record 503. In some embodiments, the "mission profile ID" attribute is a key column used for indexing or locating records. As illustrated in FIG. 5, there are 4 missions or mission profiles with corresponding record information stored to the table 500.

The "item weight" attribute indicates a particular weight of a particular parcels(s) (e.g., corrugated box) and/or goods within the parcels for a given mission. Such weight may indicated in terms of pounds, kilograms, ounces, and the like. For example, the item weight for mission profile 1 is 5 pounds.

The "item dimension(s)" attribute indicates the length, width, height, and/or any suitable dimension of one or more parcels/goods of a particular mission. Such parcel/good dimensions can be indicative of an interior volume of a parcel. For example, the item dimension of the parcel carried in mission 1, is 5×10 inches.

The "flight distance" attribute indicates a flight distance from an origin location to a target location for a given mission. An "origin location" may be any suitable location, such as a location where UAVs are deployed, a logistics facility (e.g., a sorting center or logistics store), and the like. For example, for mission 1, the flight distance from the origin location to the target location is 5 miles.

In some embodiments, the "time of mission" attribute indicates a particular time that one or more items are scheduled to be dropped off at a particular target location for a particular mission. Alternatively or additionally, in some embodiments the "time of mission" includes a particular time that a UAV must leave in order deliver one or items to a target location to deliver the one or more items by a particular time. In some embodiments, such particular time corresponds to a time of day, such as a clock time. In some embodiments, the particular time corresponds to a time stamp. In an illustrative example, for mission 1, the time of mission is 4:30 p.m.

The "number of items" attribute indicate the quantity of items that are to be delivered to a particular target location for a given mission. There may be any number of items requested for delivery by users that are to be delivered via a particular mission by a particular date. In an illustrative example, there is only 1 item to be delivered for mission 1.

The "target location coordinates" attribute indicates the location of the target location. In some embodiments, the target location coordinates are actual latitude and longitude coordinates as determined via a geolocation (e.g., GPS) module. Alternatively or additionally in some embodiments, as illustrated for mission 1, the target location coordinates indicate a residential or business address. Alternatively or additionally, in some embodiments, the target location coordinates may indicate a geo-fence, zip code, or other location indicator that the target location is within.

The "target location type" attribute indicates the type of terrain or other attributes associated with the target location. In some embodiments, the target location type is determined by the geographic terrain mapper 404 as described with respect to FIG. 4. Accordingly, for example, in response to the geographic terrain mapper 404 detecting multiple trees and other objects, it may pass, via a programmatic call, its results to the mission profile generator 406, after which point the mission profile generator 606 populates the corresponding field for the particular mission (e.g., multiple trees detected, X object detected, etc.). Alternatively or additionally, as illustrated for mission ID 1, it can be determined whether the target location is in a residential neighborhood, business neighborhood, and the like. Alternatively or additionally, the target location type attribute indicates whether the target location is in an "urban" or "rural" area. Alternatively or additionally, the target location type attribute indicates whether the particular target location has a suitable landing area (e.g., via CNN), such as a pre-built UAV landing pad or other flat surface. Such indication may be through a binary or flag-based indication such as "yes" (suitable) or "no" (not suitable). Alternatively or additionally, such indication may be the actual object detection classification of such pre-build UAV landing pad or other flat surface (e.g., A×B dimension porch detected at target location), according to some embodiments.

The "weather probability indicator" indicates the probable weather to be experienced during flight of a UAV from an origin to the target location for a particular mission. Such indicator can indicate the likely weather associated with the geographical area (that includes the target location) during or at the time of delivery of the item(s). According to various embodiments, weather indicators can be any suitable weather category indicators, such as whether there will be snow, ice, sleet, rain, sunshine, clouds, tornadoes, wind, and the like. Additionally or alternatively, these weather indicators may indicate specific quantifying variables associated with the category indicators. For example, how much snow, ice, sleet, or rain there will be during flight. In another example, these indicators may specify how long there is to be sunshine or clouds. In another example, these indicators may indicate how fast (e.g., in MPH) the wind is to blow and in what direction.

In some embodiments, the data included in the "weather probability" attribute is determined via the mission/UAV learning module 402. Accordingly, the mission/UAV learning module 402 may learn, over various historical time periods, patterns in weather for a particular geographical area that includes a particular target location. These patterns, for example, can be passed, via a programmatic call, from the mission/UAV learning module 402 to the mission profile generator 406, so that the mission profile generator 406 can populate corresponding "weather probability" fields for a given mission. Weather probability can be determined in any suitable manner using any suitable source (e.g., sensors or external sources). For example, in some embodiments, weather probability is determined based on external sources, such as Internet weather applications, national weather service, and the like. In these embodiments, these external sources can have their own APIs that that mission/UAV learning module 402 and/or the mission profile generator 406 can call these APIs to get the weather data.

The "traffic data" attribute indicates what traffic is or will be like in locations associated with a target location. For example, this attribute may indicate what the car and/or air traffic will be like from an origin location to the target location. "Air traffic" can include data indicating how many other missions or UAVs will be traversing the geographic region (e.g., a geofence) that the target location is in. Alternatively or additionally, air traffic can include data indicating how many commercial or private flights of aerial vehicles (e.g., planes or helicopters) will be traversing the geographical area. In some embodiments, such as illustrated in FIG. 5 for mission 1, the traffic data can include classifications or categories of traffic data, such as whether it will be "congested" with cars/aerial vehicles in a particular area that the target location is within. Additionally or alternatively, quantitative values are also provided, such as the time duration of congestion and/or how many cars/aerial vehicles will be present during a mission.

In some embodiments, this traffic data is at least partially determined via the mission/UAV learning module 402. In this way, the mission/UAV learning module 402 can learn historical traffic patterns for particular time periods and responsively predict a future traffic pattern for a given mission yet to occur based on the historical traffic patterns. For example, the mission/UAV learning module 402 may determine that there is likely to be heavy congestion on a particular day mission 1 is to occur, given that historical traffic patterns on the same day in previous years has always been heavily congested.

FIG. 6 is an example table 600 illustrating a plurality of UAV profiles, according to some embodiments. In some embodiments, the table 600 is what is generated or analyzed by the UAV profile generator 408 (e.g., to determine a selection of a UAV via the UAV selection module 410). In some embodiments, other components, such as the UAV learning module 402 alternatively or additionally causes information to be populated in the table 600 (e.g., via programmatically calling the UAV profile generator 408), which is described in more detail below. In some embodiments, the table 600 represents a data structure, such as a hash table, a lookup table, a database table, or the like that is stored in computer memory.

The table 600 includes various attributes, such as the "UAV profile ID" attribute, the "weight carrying capacity" attribute, the "dimension capacity" attribute, the "flight distance capability" attribute, the "release mechanism type" attribute, the "weather grade indicator" attribute, and the "noise factor indicator" attribute.

The "UAV profile ID" attribute includes an identifier that identifies a particular UAV. Each UAV has various attributes that describe capabilities or component makeup of the particular UAV, as illustrated in FIG. 6. Such identifiers correspond to entries or records, such as the record 603. In some embodiments, the "UAV profile ID" attribute is a key column used for indexing or locating records. As illustrated in FIG. 6, there are 4 UAVs or UAV profiles with corresponding record information stored to the table 600.

The "weight carrying capacity" attribute indicates the capacity (e.g., limit) of weight that a particular UAV is capable of holding, storing, or carrying. For example, the weight carrying capacity of a UAV can be 10 Lbs., 20 Lbs. (as illustrated with respect to the UAV ID 1), 5 Lbs. or the like.

The "dimension capacity" attribute indicates how large of an item a particular UAV can store, carry, or hold. Largeness may be specifically refer to a limit indication one or more dimensions, such as length, width, and/or height. For example, FIG. 6 illustrates that the UAV ID 1 is capable of carrying an item up to 10×10 dimensions.

In some embodiments, the "flight distance capability" attribute indicates the distance limit that a particular UAV may travel before requiring a recharge or other energy source (e.g., gas) refill. Alternatively or additionally, in some embodiments, the "flight distance capability" attribute indicates any particular distance limit that a UAV should travel for any one given mission regardless of when an energy resource refill is required. These embodiments may take into account an overall life expectancy (e.g., in terms of hours in the air) of a motor or other component within a particular UAV will be. For example, if a first UAV, among other UAVs, will likely last for a shorter period of time relative to the other UAVs, the first UAV may be slated to have a shorter flight distance capability per mission relative to the other UAVs.

In some embodiments, the weight carrying capacity, dimension capacity, and/or flight distance capability attributes are populated based on predetermined rules or data from outside sources, such as UAV manuals, SME (subject matter expert) publications (e.g., magazines), web information (e.g., scraped by a bot). Alternatively or additionally, in some embodiments, the weight carrying capacity, dimension capacity, and/or flight distance capability attributes are determined via the mission/UAV learning module 402. For example, the mission/UAV learning module 402 may use a trained machine learning model that has processed historical mission data from various UAVs to determine the particular weight quantity of each item each UAV carried, the dimensions of the items each UAV carried, and/or the particular distance traveled of each UAV for each mission. The mission/UAV learning module 402 additionally locate failed missions where the items weighed too much, were too large, or did not fly far enough to respective target locations. Accordingly, the learning model learns from these historical data and locates the limits or capacity of each weight, dimension, and distance capacities without failure in some embodiments. Responsively, in some embodiments, the mission/UAV learning module 402 programmatically calls the mission profile generator 406, and the mission profile generator 406 responsively populates the corresponding fields for the corresponding UAVs to indicate these capacities or limits.

The "release mechanism type" attribute indicates a category or name of a specific release mechanism included (or capable of being attached to) in a particular UAV. In some embodiments, the "release mechanism type" attribute indicates identifiers that identify specific release mechanism types, such as a tether release mechanism, a landing release mechanism, and a parachute release mechanism, which are each described in more detail below. In some embodiments, the release mechanism type itself is selected, instead of or in addition to the UAV itself based on attributes detected by the geographic terrain mapper 404. This arises is situations when particular UAVs are each suitable and capable of employing one or more suitable release mechanism typse. Accordingly, the release mechanism type itself is selected based on the geographical attributes detected (e.g., a rural area is detected, with no houses around, so a parachute release mechanism type is selected).

The "weather grade indicator" attribute indicates the type of weather that a particular UAV is capable of operating or flying in (and/or not working in or flying in). For example, the weather grade indicator may indicate that a particular UAV may operate in rain, snow (as illustrated for UAV ID 1), sleet, etc. Additionally or alternatively, the "weather grade indicator" may indicate a precise quantity associated with the weather grade. For example, the weather grade indicator attribute may indicate that a particular UAV may operate in up to X inches of snow or "heavy" rainfall or "light" snow, for example.

The "noise factor indicator" indicates how loud a respective UAV is while operating. Different UAVs tend to operate at different noise levels dependent on the architecture of their propulsion mechanisms, propellers, motors, or other components. In an example, as illustrated for UAV ID 1, the UAV 1 may operate at 80 Decibels (dB). Noise factor indicators may be useful to know in situations, such as the time of day a mission will occur at, or the type of mission (e.g., a military-based operation) being carried out (which also may be indicated in the table 500 of FIG. 5 in some embodiments). For example, if it is determined that a mission will occur at midnight and the mission type is a logistics delivery (a specific mission type), it may be desirable to select a UAV that is quieter relative to other UAVs so that nobody gets woken up by the louder UAVs.

In some embodiments, the table 600 is compared to the table 500 (e.g., by the UAV selection module 410) in order to select which UAV to use for a given mission based on one or more attributes of a given UAV (as indicated in the table 600) and one or more attributes for a given mission (as indicated in the table 500). For example, referring back to FIG. 5, the attributes for the record 503 corresponding to mission 1 may be compared against records 603 and 605 corresponding to different UAV attributes. Such comparison may include comparing attributes of the table 500 with corresponding attributes within the table 600 to make a selection. For example, as illustrated in FIG. 5, the item to be carried for mission 1 is 5 pounds. This may be compared against the weight carrying capacity of UAVs 1 and 2. Given that UAV 1 has a 20 pound carrying capacity and UAV only has a 2 pound carrying capacity, UAV ID 1 is selected (or scored/weighted higher before a selection is made). In another example, as illustrated in FIG. 5, the flight distance of mission 1 is 20 miles. This is compared against the flight distance capability attributes for the records 603 and 605, which are 50 miles and 10 miles respectively. Given that UAV 1 can fly the mission 1 distance of 20 miles (because it has a flight distance capability of 50 miles) and the UAV cannot fly the mission 1 distance of 20 miles (because it only has a flight distance capability of 10 miles), UAV 1 is selected (or scored/weighted higher before a selection is made). In some embodiments, as described herein, each attribute comparison may render a score or weight such that each score is aggregated (e.g., via summation) for each attribute comparison. For example, using the illustration above, because UAV 1 was selected or scored higher for both of the weight carrying capacity attribute and the flight distance capability attribute, UAV 1 is selected to carry out mission 1 to the specific target location of mission 1 (and UAV 2 is refrained from being selected).

FIG. 7 is a schematic diagram of an example network graph 700, according to some embodiments. In some embodiments, the network graph 700 represents the object that is used and/or generated by the UAV profile generator 408. In some embodiments, the network graph 700 is used in conjunction with or alternative to the table 600 of FIG. 6. A network graph is a pictorial representation or visualization for a set of objects where pairs of objects are connected by links or "edges." The interconnected objects are represented by points termed "vertices," and the links that connect the vertices are called "edges." Each node or vertex represents a particular position in a one-dimensional, two-dimensional, three-dimensional (or any other dimensions) space. A vertex is a point where one or more edges meet. An edge connects two vertices. Specifically, the network graph 700 (an undirected graph) includes the nodes or vertices of: 703 (indicating "Brand A, Model B payload weight C"), 705 (indicating an identity of "Brand A, Model B UAV"), 707 (indicating "Brand A, Model B payload weight D"), 709 (indicating "Brand A, Model B release mechanism type X"), and 711 (indicating "Brand A, Model B noise factor Y"). The network graph further includes the edges I, H, J-1, J-2, and G-1, G-2, G-3, G-4.

The network graph 700 specifically shows the relationships between node 705—the Brand A, Model B UAV—and various nodes representing various attributes of the Brand A, Model B UAV. It is understood that these nodes are representative only. As such, the nodes may alternatively or additionally represent other information (e.g., dimensions of items on particular missions, flight distances recorded on particular missions, etc.).

The network graph 700 represents or illustrates the specific relationships between the particular UAV (node 705) and various associated attributes. In some embodiments the quantity of edges (and/or thickness of the edges) represents the confidence level or strength of relationship between a UAV and a given attribute. For example, between the nodes 705 and 703, there are 4 edges (i.e., G-1, G-2, G-3, an G-4) representing the highest strength of relationship between any two given nodes, whereas all the other nodes only have 1 or 2 edges connecting each other, which indicates a relatively lower strength relationship. Such strength of relationship or number of edges may be determined via training or other processes where the same attribute information has been determined for a particular UAV. For example, there may be a one-to-one correspondence between the number of edges present in the network graph 700 and the amount of missions made for the Brand A, Model B UAV. For instance, for a first mission corresponding to G-4, the Brand A, Model B UAV may have carried 20 pounds worth of a payload (payload weight C), which may have been repeated for missions corresponding to G-3, G-2, and G-1. Accordingly, the weight carrying payload may be 20 pounds based on this history. However, node 707 indicates that for missions corresponding to J-1 and J-2, the payload may have been a relatively different value, such as 21 pounds. In some embodiments, because the quantity or amount of edges is higher between nodes 705 and 703 relative to nodes 705 and 707, the weight carrying capacity is set to the payload weight C, as indicated in nodes 703 (e.g., based on the amount of successful history of flying with that particular payload weight). Alternatively, in some embodiments the node 707 represents payload weights for which the mission was unsuccessful. Accordingly, because there are more edges between node 705 and 703 relative to nodes 705 and 707, the payload weight capacity of node 703 is selected.

Some embodiments traverse the graph 700 by selecting every node within N distance relative to the node 705. In some embodiments, a "distance" in terms of network graphs corresponds to a number of edges (or edge sets) in a shortest path between vertex U and vertex V (Light Detection and Ranging) units. These are sensors that detect objects and build a map of a geographical environment based on transmitting a plurality of light pulses a second and measure how long it takes for those light pulses to bounce off of objects in the environment back to the sensor (e.g., 150,000 pulses per second). These LIDAR units can indefinitely spin transversely in a plane parallel to the ground capturing a 360-degree image of a UAVs (e.g., UAV 800) surroundings. The output is a three-dimensional mapping of the geographical environment. These sensors can also calculate the distance between itself and the objects within the environment, as well as detecting exact sizes, colors, shapes of objects, and/or other metadata.

In some embodiments, UAVs additionally or alternatively include on-board radar units. These sensors are similar to the LIDAR units in that they also transmit signals and measure how long these signals take to bounce off objects back to the sensor. However, these signals are radio waves, instead of light pulses (which are faster). These sensors detect road dynamics, such as detours, traffic delays, vehicle collisions, and other objects. Long range radar typically detects objects further away compared to LIDAR, which can be used for adaptive cruise control and the like. Whereas LIDAR typically detects objects that are less far away and is used for emergency braking, pedestrian detection, collision avoidance, etc.

In some embodiments, UAVs additionally or alternatively include one or more cameras that utilize object recognition or computer vision algorithms to detect and classify objects, such as lane lines and traffic signs. These cameras can provide images to a computing device for determining depth of field, peripheral movement, and dimensionality of objects. In some embodiments, these cameras use deep learning or other machine learning models and techniques for object classification. For example, in some embodiments, convolutional neural networks (CNN) are used to detect and classify objects, such as determining and classifying objects (e.g., car, person, traffic light, etc.). The one or more cameras can be used for short-distance recognition, such park assistance, compared to other sensors, such as LIDAR.

In various embodiments, in response to the detecting or identifying these objects in the geographical environments 830 and 840, a mapping can be generated that includes an image representing the geographical environments 830 and 840. Mappings are described in more detail below with respect to FIG. 8C. This mapping can then be used to indicate the type of terrain or other geographical area associated with a target location (e.g., as indicated in the "target location type" attribute of FIG. 5).

In some embodiments, the UAVs 800 and 900 form a mesh network of vehicles that communicate sensor data with each other (e.g., in near-real-time). In some embodiments, this data is used to update a mapping that each UAV already has. A "mesh network" as described herein includes a set of devices (e.g., nodes) that are directly (e.g., no central server) communicatively connected to each other, and if a failure at one device occurs another device could be used in proxy. In this way, crowdsourced map data from multipole UAVs for multiple geographic regions can be connected and used to detect features of various target locations.

FIG. 8B is a schematic diagram of a UAV 850 that traverses the same geographical environments of FIG. 8A for a particular mission and is selected or detects objects based at least in part on the mapping that occurred at FIG. 8A. At a time later than the mapping and detecting of objects as illustrated in FIG. 8A, the UAV 850 may traverse the same geographical environments 530 and 540. In some embodiments, based at least in part on the mapping generated according to the detecting and identifying actions of FIG. 5A, the UAV 850 senses the same objects 805, 807, 809, 811, 813, 817, 823, 819, as it traverses the road 803, 815, and 821. In this way, for example, before the UAV 850 traverses down the road 803, the UAV 850 can be selected (e.g., via the UAV selection module 410 of FIG. 4) based on the map attributes of FIG. 8A. Additionally or alternatively, the map can be uploaded such that the UAV 850 already has an indication of the larger geographical environment surrounding it. In this way, there is redundancy in object detection or there is not as much emphasis on real-time or near real-time object detection or identification if, for example, there is bad weather hindering camera's or other sensor's ability to detect objects.

FIG. 8C illustrates an image of a generated mapping, according to some embodiments. In various embodiments, a "mapping" as referred to herein indicates an image (e.g., digital image) of a real-world geographical environment and includes other metadata (e.g., speed limit of roads or other transportation rules). In some embodiments, the image in FIG. 8C represents a street and immediate environment in one of the geographical environments 830 or 840. As illustrated, various road lines, buildings, trees, buildings, etc. are represented in the image, which is a representation of an actual geographical environment. As described herein, this image can be generated based on the detection of objects via LIDAR, radar, camera, and/or other sensors as described with respect to FIG. 8A. In some embodiments, the image is part of a high definition (HD) map. In some embodiments, the generated mapping has various layers, such as a base map layer (SD map) (bottom or base layer), a geometric map layer, a semantic map layer, a map priors layer, and/or a real-time layer (top-most layer). Each of these layers can be aligned with each other and indexed, which allows for efficient parallel lookups of information both for the current location of the AV and also the local environment. Each layer adds specific data to the overall map.

In various embodiments, the base map layer includes basic road network data (e.g., 2D maps or street view maps), such as maps offered by web map services (e.g., GOOGLE MAPS). In some embodiments, the geometric map layer includes 3-dimensional information of a geographical environment. Raw sensor data obtained from LIDAR, radar, and/or other sensors is processed using particular algorithms (e.g., simultaneous localization and mapping "SLAM" techniques) to first build a 3D view of the geographical environment. The output of these algorithms are a 3D point cloud and particular trajectory that the mapping vehicle (e.g., a UAV or other logistics vehicle 800) took. The output can additionally or alternatively include data that is post-processed to produce map objects (e.g., mountains, streets, hills, outline of street lights, etc.) that are stored in the geometric map. For example, these objects can include voxelized (a unit of graphical data that represents a point in three-dimensional space) geometric maps and ground maps. The ground maps are used to models of the ground in sections. The ground map can be used to align the other layers of the map, such as the semantic map.

The semantic map layer adds semantic objects (e.g., trees, telephone wires, buildings, lane boundaries, parking areas, crosswalks, traffic signs, lights, etc.) to the geometric map layer. These objects can contain corresponding metadata, such as speed limits, turn restrictions (e.g., U-turn is prohibited), or any other transportation rules associated with the specific features of the mapped geographic area. Although a 3D point cloud as indicated in the geometric map layer may include all of the pixels and/or voxels that represent an object, such as a traffic light, the semantic map layer is the layer that stores all of the other information (e.g., metadata, such as speed limit of a road) about particular objects. In some embodiments, human operators can validate or fix any information contained in the semantic layer for consistency and accuracy. In some embodiments, the semantic layer can use the ground map generated by the geometric layer to identify z-positions of lane areas. The geometric and semantic map layers capture the static physical objects of a geographical environment. The maps prior layer and real-time layers conversely captures the dynamic and behavioral aspects of the geographical environment.

The map prior layer includes dynamic information and human driving behavior or UAV flight behavior. This can include both semantic and geometric information. For example, information such as the order in which traffic lights at a particular intersection cycle through their various states (e.g., red, green, protected-left, yellow, read, etc.) and the amount of time spent in each state are encoded in the map priors layer. This layer can also include the time/timestamp and day of week that the mappings occurred. Data in this layer can be used by prediction systems. For example, areas of street lanes with metadata can capture the probability of encountering a parked vehicle at the particular area. The real-time layer is configured to be updated in real/near-real time. This layer includes real-time traffic information (e.g., to be used by the "traffic data" attribute of FIG. 5), such as current speed of vehicle(s), traffic congestion, current pedestrians, new construction zones, etc. In various embodiments, alignment algorithms are employed to connect all of the layers as an entire mapping.

FIG. 9 is a schematic diagram of an example visualization of vector space 900 that illustrates various feature vectors representing one or more real world objects (e.g., for object detection) and/or other labels (e.g., a classification of a weather pattern, weight carrying capacity, dimension capacity, flight distance capacity, weather grade indicator, etc.), according to some embodiments. In some embodiments, the feature space 900 represents the functionality produced (or used) by the geographic terrain mapper 404 to determine what geographical type classification/cluster that a particular geographical location is in. Alternatively or additionally, in some embodiments the feature space 900 represents the functionality produced or used by the mission/UAV learning module 402 to classify or cluster a particular UAV as being within a certain weight carrying capacity group, dimension capacity group, flight distance capability group, and/or weather grade indicator group. In some embodiments, the vector space 900 represents any vector space described herein.

In some embodiments, the vector space 900 includes classes of data points (e.g., data point 903-1 and data point 903-2) representing individual feature vectors corresponding to specific attributes. These data points are formed together to form a particular class (or cluster). For example, the data point 903-1 and data point 903-2 (e.g., individual target locations) may have been classified as "rural locations" 903 (indicative that the feature values of the data points 903 are within a threshold distance to or similar to other trained data points). There are other classes, such as class 905 (e.g., "urban location" 905) and the class 905 (e.g., "dense city location).

In an illustrative example of how the feature space 900 is used, embodiments may receive an indication that a mission is to occur at a particular target location. Responsively, some embodiments run an image of the target location (as determined via the maps produced via FIG. 8A) through one or more machine learning models in order to weight features for the target location, after which a feature vector (e.g., representing the data point 903-1) is embedded in the feature space 900. The feature space 900 in various embodiments represents a multidimensional coordinate system where each feature is associated with one or more dimensions. For example, a first set of values in a vector may represent a first set of objects detected (e.g., trees) in the target location image, where a first axis represents the first set of values and a second axis represents a second set of values of the same vector, which is a second set of objects detected in the same image of the target location. Each feature value within the feature vector may be summed or otherwise aggregated to arrive at a final coordinate point (e.g., the data point 903-2) within the feature space 900. Each of the data points within the class 903, for example, are within a feature similarity threshold and so they are close to each other (e.g., based on Euclidian distance) in the feature space 900. Responsive to the embedding of the feature vector in the feature space 900, embodiments classify or cluster the vectors. For example, if a first vector represents data point 903-1, then the classification that is nearest to the data point 903-1 is the "rural" classification 903 indicative of the corresponding target location being within a "rural" area.

The machine learning model(s) are able to cluster samples of new unseen target locations. In some embodiments, each target location or surrounding area, or other label, is represented by the median of its samples' embeddings as shown: $C=\text{median } \{\text{fembed}(S_{ij}): I=1, 2, \ldots, n\}$, Where fembed is the output of the model, $S_{ij}$ is the ith sample of the jth class. The prediction for any test sample X is given by: $\text{Pred}(X) = \arg(\min)_{i,j}\|C_j - \text{fembed}(X)\|$. However, it is understood that median is just one way to represent an embedding. Some embodiments alternatively use other statistics like mean, pth percentile, and the like.

FIG. 10 is a perspective top view of a UAV 1002 within a geographical environment, illustrating how an item is deployed via a parachute release mechanism, according to some embodiments. As described herein, in some embodiments, a UAV is selected (e.g., by the UAV selection module 410) based at least in part on the release mechanism the UAV employs and further based at least in part on a geographical area that a target location is within. As illustrated in FIG. 10, the target location 1000-1 (e.g., a set of geo-coordinates or address) is within the geographical area 1000. This geographical area 1000 may represent a rural area where there are no other surrounding houses nearby and indicated by the dense shrubbery 1008 and the single residential home 1010.

As described herein, various embodiments, such as the geographic terrain mapper 404, can detect or map out various features within the geographical environment 1000, such as the dense shrubbery 10008 and the residential dwelling 1010 and responsively populate a data structure (e.g., under the target location type attribute of FIG. 5) to classify or otherwise determine what type of geographical environment the target location 1000-1 is in. Responsive to this determination, as described herein, various embodiments can compare this geographical environment type to a release mechanism type of a UAV (e.g., as indicated in the "release type mechanism" attribute of FIG. 6) and responsively select a UAV based on such comparison. For example, because the geographic environment 1000 may be classified as "rural," embodiments can select the UAV 1002 as the UAV to deliver the item 1004 via the parachute release mechanism 1002-1.

A "parachute release mechanism" is any component (e.g., levers, clasps, or actuators) of a UAV that causes one or more corresponding items to be deployed (or pushed off a UAV) via a parachute. Parachute release mechanisms may be desirable when target locations are open (e.g., there are no other surrounding housing, shrubbery, or other structures), are in rural areas, or are otherwise located in areas where there an item is less likely to be damaged (e.g., ran over by a car), less likely to get stuck on a structure (e.g., skyscraper or large tree), and the like, as illustrated by the geographical environment 1000.

In an illustrative example of a parachute release mechanism, the parachute release mechanism 1002-1 may include a set of levers that, when activated, cause a set of clasps that are gripping the item 1004 to be released when the UAV 1002 is above or at the target location 1000-1, such that there is no longer any gripping force experienced by the item 1004 via the clasps. Accordingly, responsive to this release, the item 1004 is deployed and falls to the ground near the target location 1000-1 via gravitational forces, while opposing parachute forces caused by the parachute 1006 causes the item 1004 to glide to the ground. In another example, the parachute release mechanism 1002-1 may include a set of levers that are configured to push the item 1004 off of a platform within the UAV 1002 and into open space, such that the item 1004 is deployed as illustrated in FIG. 10.

The actual deployment of the parachute 1006 itself coupled to the item 1004 occurs in any suitable manner according to various embodiments. For example, in some embodiments, the parachute 1006 is mechanically deployed based on fluid mechanics of opposing air stream forces due to the gravitational drop of the item 1004 to the ground. For example, in response to the non-deployed parachute 1006 experiencing a force over a threshold, the parachute 1006 becomes fully deployed, as illustrated in FIG. 10. In another example, in some embodiments, the UAV 10002 (Or other component, such as a server) transmits a radio signal to a receiver coupled to the item 1004, which responsively causes deployment of the parachute 1006, as illustrated in FIG. 10.

FIG. 11 is a perspective top view of a UAV 1102 within a geographical environment, illustrating how an item is deployed via a tether release mechanism, according to some embodiments. As described herein, in some embodiments, a UAV is selected (e.g., by the UAV selection module 410) based at least in part on the release mechanism the UAV employs and further based at least in part on a geographical area that a target location is within. As illustrated in FIG. 11, the target location 1100-1 (e.g., a set of geo-coordinates or address) is within the geographical area 1100. This geographical area 1100 may represent an urban area where there are other surrounding dwellings 1114, 1110, and 1108 nearby.

As described herein, various embodiments, such as the geographic terrain mapper 404, can detect or map out various features within the geographical environment 1100, such as the fact that there are no landing pads, dwellings 114, 110, 1108, and responsively populate a data structure (e.g., under the target location type attribute of FIG. 5) to classify or otherwise determine what type of geographical environment the target location 1100-1 is in. Responsive to this determination, as described herein, various embodiments can compare this geographical environment type to a release mechanism type of a UAV (e.g., as indicated in the "release type mechanism" attribute of FIG. 6) and responsively select a UAV based on such comparison. For example, because the geographic environment 1100 may be classified as "urban" and "no landing pad," embodiments can select the UAV 1102 as the UAV to deliver the item 1104 via tether release mechanism 1102-1.

A "tether release mechanism" is any component (e.g., levers, spool, or actuators) of a UAV that causes one or more corresponding items to be deployed (or pushed off a UAV) via a tether (e.g., a chord or rope mechanism). Tether release mechanisms may be desirable when target locations require more targeted delivery (e.g., because of multiple structures, such as the dwellings 1114, 1110, and 1108, skyscrapers, vehicles, etc.) relative to parachute release mechanism, are in urban areas, and/or do not have a particular landing pad for a UAV. Various geographical environments typically do not have dedicated landing pads for UAVs, such as urban neighborhoods, as illustrated in the geographical environment. Accordingly, in response to this detection, some embodiments select UAVs with tether release mechanisms. Some embodiments alternatively use different release mechanisms, such as winch delivery systems, as described in U.S. Non Provisional patent application Ser. No. 17/136, 405 entitled "AUTOMATIC RELEASE CLAMP," filed Dec. 29, 2020, which is incorporated by reference in its entirety.

The tether release mechanism 1102-1 is configured to cause the item 1104 to be lowered, via the tether 1120, directly to a surface of the target location 1100-1, or lowered to a position above the surface of the target location 1100-1, such that the item 1104 is suspended in the air so that a consignee or other recipient can grab the item 1104. In an illustrative example of how the tether release mechanism 1102 operates, this mechanism may include a spool that is configured to wind up the tether 1120 while the item 1104 is loaded or coupled to the UAV 1102 (e.g., before the item 1104 is deployed to the target location 1100-1). Responsive to receiving an indication that the item 1104 is ready to be deployed to the target location 1100-1, the spool within 1102-1 may axially rotate, thereby causing the tether 1120 to elongate, which causes the item 11004 to lower to the target location 1100-1. In some embodiments, the spool keeps spinning until there is no more available tether 1120, at which point there is a disengagement of the tether 1120 from the tether release mechanism 1102-1, at which point the UAV 1102 can fly back to its origin location. In alternative embodiments, the tether 1120 is detachable near an end where it is coupled to the item 1104 (as opposed to an end within the tether release mechanism 1102-1). For example, a bump sensor, accelerometer, and/or a gyroscope within the item 1104 may experience movement or force above a threshold (e.g., indicating that the item 1104 has touched a ground surface), which automatically causes the tether 1120 to be disengaged from the item 1104, at which point the UAV 1102 can fly back to its origin location.

FIG. 12 is a perspective top view of a UAV 1202 within a geographical environment, illustrating how an item is deployed via a landing release mechanism, according to some embodiments. As described herein, in some embodiments, a UAV is selected (e.g., by the UAV selection module 410) based at least in part on the release mechanism the UAV employs and further based at least in part on a geographical area that a target location is within. As illustrated in FIG. 12, the target location (e.g., a set of geo-coordinates or address) is within the geographical area 1200, and refers to the landing pad 1212. This geographical area 1200 may represent a densely populated urban area where there are various skyscraper structures 1210 and 1208.

As described herein, various embodiments, such as the geographic terrain mapper 404, can detect or map out various features within the geographical environment 1100, such as the fact that there is a landing pad 1212, structures 1210, and 1208, (and/or a recharge/refuel point or a parcel pick-up point) and responsively populate a data structure (e.g., under the target location type attribute of FIG. 5) to classify or otherwise determine what type of geographical environment the target location is in. Responsive to this determination, as described herein, various embodiments can compare this geographical environment type to a release mechanism type of a UAV (e.g., as indicated in the "release type mechanism" attribute of FIG. 6) and responsively select a UAV based on such comparison. For example, because the geographic environment 1200 may be classified as "urban" with a "landing pad," embodiments can select the UAV 1202 as the UAV to deliver the item 1204 to the landing pad 1212.

In some embodiments, the landing pad 1212 refers to a platform, enclosure, or other structure that is configured to be a landing spot for one or more UAVs. In some embodiments, landing pads are not explicitly configured to be a landing spot for one or more UAVs, but may rather be structures that are capable of being landing spots for UAVs, but are also used for other actions. For example, a landing pad may be a residential dwelling porch, a business rooftop, etc. Examples of landing pad structures (referred to as "delivery platforms") are described in U.S. application Ser. No. 16/704,967 titled "Drone Delivery Platform to Facilitate Delivery of Parcels by Unmanned Aerial Vehicles," filed on Dec. 5, 2019, the contents of which are incorporated by reference in its entirety.

A "landing release mechanism" is any component (e.g., levers, clasps, or actuators) of a UAV that causes one or more corresponding items to be deployed from a UAV directly onto a surface of a landing pad. In these embodiments, UAVs typically fly directly to a landing pad, as opposed to remaining suspended in the air as is the case with UAVs that employ parachute or tether release mechanisms. Landing release mechanisms may be desirable when target locations require very targeted delivery, when UAVs are carrying items that are fragile, when target locations are in urban areas, and/or a particular landing pad has been detected (e.g., via the geographic terrain mapper 404). Various geographical environments have dedicated landing pads for UAVs, as illustrated in the geographical environment 1200. Accordingly, in response to this detection of the landing pad 1212, some embodiments select UAVs with landing release mechanisms. Examples of other geographical environments are described in non-provisional patent application Ser. No. 16/704,974 entitled "A CONTAINMENT UNIT FOR FACILITATING PARCEL DELIVERY BY UNMANNED AERIAL VEHICLES," filed Dec. 5, 2019, which is hereby incorporated by reference in its entirety. Other examples of a geographical environment are described in non-provisional patent application No. 62/776, 355 entitled "A DRONE DELIVERY PLATFORM TO FACILITATE DELIVERY OF PARCELS BY UNMANNED AERIAL VEHICLES," filed Dec. 6, 2018, which is hereby incorporated by reference in its entirety.

The landing release mechanism 1202-1 is configured to cause the item 1204 to be deployed directly to a surface of the landing pad 1212. In an illustrative example of how the landing release mechanism 1202-1 operates, the landing release mechanism 1202-1 may include a set of levers that, when activated, cause a set of clasps that are gripping the item 1204 to be released once the UAV 1202 has landed on the landing pad 1212 such that there is no longer any gripping force experienced by the item 1204 via the clasps. Accordingly, responsive to this release, the item 1204 is deployed and is released to the landing pad 1212. In another example, the landing release mechanism 1202-1 may include a set of levers that are configured to push the item 1204 off of a platform within the UAV 1202 and onto the landing pad 1212.

IV. Exemplary System Operation

FIG. 13 is a screenshot 1300 of an example user interface, according to some embodiments. In some embodiments, the screenshot 1300 is generated by the presentation module 412, as described with respect to FIG. 4. In some embodiments, the screenshot 1300 represents a web page of a web application. In some embodiments, the screenshot 1300 represents an app page of a locally stored or extension-based app.

FIG. 13 illustrates that a particular UAV is selected based on attributes of a particular mission. The UI element 1301 requests that a user input various mission attributes. In some embodiments, a user has the option to automatically upload or synchronize mission attributes, as opposed to manually inputting information. For example, a user may request shipment, via an online marketplace, of an item. Such request may include or be proceeded by the user inputting shipping information, such as user shipping address, the item to be shipped, the shipping date, and the like. In response to the executing of this request, some embodiments, for example, automatically upload the mission attributes indicated in the UI element 1301 (i.e., 1302, 1304, 1306, 1308, 1310, 1312) that the user at purchase time inputted. In this way an administrator or person responsible for selecting which UAV to use, does not have to manually input this information that has already been provided by another shipping user.

Each of the UI elements 1302, 1304, and 1306 are configured to provide display of different options in response to user selection of the respective UI elements. For example, in response to a selection of the item weight element 1302, various embodiments cause display of different weights or weight ranges, such as 0-2 Lbs., 2-4 Lbs., 5-10 Lbs., etc. Further, in response to a selection of the item dimensions UI element 1304, different item dimension options can also be displayed. In response to a selection of the number of items UI element 1304, different options for number of items can be caused to be displayed (e.g., 1, 2, 3, 4, 5, etc.). In response to a selection of the mission location UI element 1308, a field may be caused to be displayed so that a user can input the address or other geocoordinates of where an item is to be dropped off. In some embodiments, this is used to determine the "flight distance," as described with respect to FIG. 5. In response to receiving an indication of a selection of the mission time UI element 1308, some embodiments cause display of a field that is configured to receive user input of the particular time that the item is to be delivered.

In response to receiving an indication that the mission location description 1312 has been selected, a field is caused to be displayed so that a user can described, in natural language, the target location and/or geographical area surrounding the target location. In these embodiments, particular aspects (e.g., the geographic terrain mapper 404) use natural language processing (NLP) to aid in the identification of the "target location type," as described with respect to FIG. 5. In some embodiments, any of the information located in the table 500 can be populated based on selections made from the screenshot 1300 of FIG. 13.

In some embodiments, in response to receiving an indication that the user has selected the submit button various embodiments analyze the inputted (or synchronized) attributes indicated in the UI element 1301. For example, in response to receiving an indication of the submit button 1314, the geographic terrain mapper 404, the mission profile generator 406, the mission/UAV learning module 402, and/ or the UAV selection module 410 performs its functionality to select an appropriate UAV. As illustrated via the UI element 1316, the Brand A, model B UAV has been selected based on the inputted mission attributes 1301.

Some embodiments rank different UAVs based on the mission attributes 1301. Accordingly, although some embodiments select a UAV for recommendation purposes, some embodiments rank different UAVs in case a user does not want to use the recommended or selected UAV. Accordingly, in response to receiving an indication that the button 1318 has been selected, various embodiments cause display of other identifiers that indicate additional UAVs, which can be based on the ranking. In some embodiments, such ranking is performed based on the weights and scores generated, as described herein with respect to the UAV selection module 410 of FIG. 4. In this way, for example, higher listed UAV identifiers in the screenshot 1300 have higher scores and lower listed UAV identifiers in the screenshot 1300 have lower scores.

FIG. 14 is a flow diagram of an example process 1400 for training a machine learning model, according to some embodiments. In some embodiments, the process 1400 is performed or used by the mission/UAV learning module 402 and/or the geographic terrain mapper 404, as described herein with respect to FIG. 4.

The process 1400 (and/or any of the functionality described herein) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Added blocks may include blocks that embody any functionality described herein (e.g., as described with respect to FIG. 1 through FIG. 13). The computer-implemented method, the system (that includes at least one computing device having at least one processor and at least one computer readable storage medium), and/or the computer readable medium as described herein may perform or be caused to perform the process 800 or any other functionality described herein. In some embodiments, the process 800 is performed by the training component (not shown) as described with respect to the accessory/sub-accessory determiner 109.

Per block 1402, one or more inputs (e.g., an image or photograph, historical flight data) are received. In some embodiments, the one or more inputs have been labelled or classified according to features within the inputs prior to training. For example, some embodiments are supervised and may receive a user input label of "tree" or "landing pad" indicative of an image having these corresponding objects. Alternatively, in some embodiments the one or more inputs are not labeled or have no classification prior to training, such as in some unsupervised machine learning contexts.

In an illustrative example of block 1402, some embodiments receive historical flight data that indicates attributes associated with one or more historical deliveries and one or more UAVs that have traversed over a geographical area to make the one or more one or more historical deliveries. Such attributes can include, for example, any of the information described with respect to FIG. 5, such as item weight, item dimensions, flight distance, time of mission, number of items carried, target location coordinates, target location type, weather at the time of delivery, traffic data, and whether the mission was successful in delivering the items to the target location on time.

Per block 1404, particular embodiments extract one or more features from each of the one or more inputs. For example, some embodiments (e.g., the geographic terrain mapper 404) extract objects (e.g., landing pads, residential dwellings, buildings, etc.) from pixels. In another example, some embodiments extract features from the historical flight data as described above with respect to block 1402.

Per block 1406, one or more training sets are identified for the input(s). For example, in a supervised context where inputs are labelled, inputs with the same label are identified in preparation for training. In an illustrative example, pairs of inputs that have the same label can be paired, as well as pairs of inputs that have differing labels can be paired. In unsupervised context where inputs are not labeled, any input can be paired with any other arbitrary or randomly selected other image.

Per block 1408, a machine learning model (e.g., a deep learning model) is trained based at least in part on learning weights associated with the extracted features. For example, using the illustration above, the machine learning model can weight certain structural features of a landing pad (e.g., a platform shape) for object detection purposes in order to train the machine learning model to detect landing pads in images. In another example, the machine learning model can learn various features for the historical flight data, as described above with respect to block 1402. For example, embodiments can learn that a first UAV can carry a capacity of 20 pounds based on past missions that it has successfully completed and failed, even though, for example, an owner's manual may indicate that the UAV can carry up to 30 pounds.

In some embodiments, pairs of same labeled inputs (e.g., two "tree" object inputs) and dissimilar labelled inputs (e.g., one "tree" input and one "dwelling" input) are processed or run through a deep learning model by comparing the associated features and mapping it in feature space. And based at least in part on the processing, weights associated with the deep learning model can be adjusted to indicate the importance of the extracted featured for prediction or classification. In some embodiments, as described herein, the adjusting includes activating, strengthening, or inactivating a neuron or node in a neural network. In some embodiments, the adjusting includes changing an embedding in feature space of a feature vector representing the image feature(s). For example, after a first round or epochs of training, it may be unknown which of the extracted features are important for taking on a certain classification or prediction. Accordingly, each feature may take on equal weight (or close to equal weight within a threshold, such as a 2% changed weight) such that all of the input feature vectors are substantially close or within a distance threshold in feature space. However, after several rounds of training or any threshold quantity of training, these same feature vectors may adjust or change distances from each other based on the feature value similarity. The more features of two feature vectors that match or are within a threshold value, the closer the two feature vectors are to each other, whereas when features do not match or are not within a threshold value, the further away the two feature vectors are from each other. Accordingly, for example, a trained embedding may look similar to the feature space 900 of FIG. 9.

FIG. 15 is a flow diagram of an example process 1500 for recommending or selecting a UAV to deliver one or more items to a target location, according to some embodiments. In some embodiments, the process 1500 occurs subsequent to the training of the machine learning model via the process 1400 of FIG. 4.

Per block 1502, a first set of attributes associated with a target location is determined. In some embodiments, the target location is a location that one or more items are to be delivered to by a UAV. In some embodiments, block 1502 is determined by the mission profile generator 406 as described with respect to FIG. 4. Examples of this determination at block 1502 is described with respect to determining the "target location coordinates" and "target location type" attributes as illustrated in the record 503 of FIG. 5, for example.

In some embodiments, the determining at block 1502 includes detecting, via a machine learning model, objects within the geographical area, where the selecting or recommending of the UAV at block 1506 is based at least in part on the objects detected via the machine learning model. Examples of such detecting is described above with respect to the geographic terrain mapper of FIG. 4. For example, some embodiments utilize a CNN and a bounding box to determine that there is a landing pad or closely situated dwellings next to a target location. Accordingly, embodiments can select a UAV that has a landing release mechanism, as described above with respect to FIG. 12. In some embodiments, the determining at block 1502 is preceded by receiving a mission profile (e.g., as described with respect to the record 503 of FIG. 5). A mission profile describes one or more attributes associated with a delivery of one or more items that are to be made to a target location. In response to receiving such mission profile, the first set of attributes (located in the mission profile) are determined at block 1502.

In some embodiments, the determining at block 1502 includes analyzing mapping data. Specifically, mapping data can be received via one or more on-board sensors located on one or more UAVs (or other logistics vehicles) that have traversed over the geographical area. Such mapping data indicates an image (e.g., as illustrated in FIG. 8C) of the geographical area and further includes metadata (e.g., driving rules as illustrated in FIG. 8C). Examples of this are described with respect to FIGS. 8A and 8C where a set of UAVs traverse individual geographical areas 840 and 830 at a first time to generate a map of a geographical area in order to be used for a future mission (e.g., as illustrated in FIG. 8B).

In some embodiments, the first set of attributes include at least one attribute in a group of attributes that include: a weight of the one or more items, one or more dimensions of the one or more items, a flight distance from an origin location to the target location, likely weather associated with the geographical area during delivery of the one or more items, a time of day that the one or more parcels are to be delivered to the target location, and traffic data associated with the geographical area. Examples of all of these attributes are described above with respect to the table 500 of FIG. 5.

Per block 1504, certain embodiments compare the first set of attributes with a second set of attributes, where the second set of attributes indicate one or more attributes of each UAV of a plurality of UAVs. Examples of such comparing are described with respect to the UAV selection module 410 of FIG. 4 and the comparing of the records 603 and 605 of FIG. 6 to the record 503 of FIG. 5.

In some embodiments, block 1504 is preceded by receiving a plurality of UAV profiles (e.g., records 603 and 605), where each UAV profile describes one or more attributes of a respective UAV. Responsively, certain embodiments compare the mission profile with each UAV profile of the plurality of UAV profiles.

In some embodiments, the second set of attributes at block 1504 include at least one attribute in the following group: a release mechanism type of each UAV, a weight carrying capacity of each UAV, one or more dimension carrying capacities of each UAV, a flight distance capability of each UAV, a weather grade indicator of each UAV, and a noise factor of each UAV. Examples of these attributes are described with respect to the table 600 of FIG. 6.

In some embodiments, the release mechanism type for each UAV, of the plurality of UAVs, includes at least one type of the following: a tether release mechanism, a landing release mechanism, and a parachute release mechanism, as described, for example, with respect to FIG. 10, FIG. 11, and FIG. 12.

Per block 1506, certain embodiments recommend (or select) a UAV, of the plurality of UAVs, to deliver one or more items to the target location based on the comparing at block 1504. Examples of block 1506 are described above with respect to the UAV selection module 410 of FIG. 4.

Some embodiments select or recommend the UAV at block 1506 based at least in part on the weight of the one or more items, the one or more dimensions of the one or more items, the flight distance, the likely weather, the time of day, the traffic data, a weight carrying capacity of each UAV, a dimension carrying capacity of each UAV, a flight distance capability of each UAV, a weather grade indicator of each UAV, a noise factor indicator of each UAV, and/or a release mechanism type of each UAV, as described, for example, with respect to FIG. 5, FIG. 6, FIG. 10, FIG. 11, and FIG. 12. For example, some embodiments determine that a particular mission is to carry an item that is 10 pounds. However, only one UAV, of the plurality of UAVs, may be suitable to carry 10 pounds (e.g., it can carry 20 pounds). Accordingly, this UAV can be selected at block 1506.

Some embodiments recommend or select the UAV at block 1506 based at least in part on machine learning functionality. For example, based on training (e.g., the process 1400 of FIG. 14), some embodiments generate a decision statistic (e.g., a classification or cluster prediction) associated with a feature of the target location, the one or more items, or the UAV. For example, some embodiments detect a landing pad at the target location and select a UAV with a landing release mechanism that can directly cause an unloading at the landing pad. Similarly, some embodiments predict, via a machine learning model, whether the UAV will be successful in delivering the one or more items based on historical flight data (e.g., the historical flight data received at block 1402 of FIG. 14). For example, some embodiments predict that a past UAV has successfully carried 20 pounds but not 30 pounds based on various historical flight. Therefore, this same UAV will not be selected for a current mission that includes a payload of 40 pounds based on the historical flight data indicating that the UAV has not been successful with past missions carrying loads over 30 pounds.

In some embodiments, a route is selected to deliver the one or more items to the target location based on the comparing at block 1504. For example, referring back to FIG. 5, if it determine that weather probability or traffic data along a first route to a first target location is over some weather condition threshold (e.g., there is heavy rain projected) or traffic data threshold (e.g., there are more than 10 UAVs expected to be in the same area around the same time), some embodiments change from the first route to a second route to deliver the items to the first target location. For example, the second route may be a detour, take a longer travel time, and be longer in distance. However, the second route may not be subject to the same weather condition threshold or traffic data threshold as the first route. Accordingly, the second route is selected.

In some embodiments, based on the recommending (or selecting) at block 1506, the UAV is caused to deliver the one or more items to the target location. As described herein, such causing can include directly sending a control signal to a selected to UAV to cause the UAV to fly to an operator so that the operator may load the UAV with one or more items that are to be delivered to the target location. Alternatively, such causing may be in the form of a notification (e.g., the UI element 1316). For example, a user device can be notified that a particular UAV is selected, after which the corresponding user locates the UAV and loads the one or more items to the UAV.

Definitions

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "data store" as described herein is any type of repository for storing and/or managing data, whether the data is structured, unstructured, or semi-structured. For example, a data store can be or include one or more: databases, files (e.g., of unstructured data), corpuses, digital documents, etc.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

The terms first (e.g., first request), second (e.g., second request), etc. are not to be construed as denoting or implying order or time sequences unless expressly indicated otherwise. Rather, they are to be construed as distinguishing two or more elements. In some embodiments, the two or more elements, although distinguishable, have the same makeup. For example, a first memory and a second memory may indeed be two separate memories but they both may be RAM devices that have the same storage capacity (e.g., 4 GB).

The term "causing" or "cause" means that one or more systems (e.g., computing devices) and/or components (e.g., processors) may in in isolation or in combination with other systems and/or components bring about or help bring about a particular result or effect. For example, the analysis computing entity 105 may "cause" a message to be displayed to a computing entity 110 (e.g., via transmitting a message to the user device) and/or the same computing entity 110 may "cause" the same message to be displayed (e.g., via a processor that executes instructions and data in a display memory of the user device). Accordingly, one or both systems may in isolation or together "cause" the effect of displaying a message.

The term "real time" includes any time frame of sufficiently short duration as to provide reasonable response time for information processing as described. Additionally, the term "real time" includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

V. CONCLUSION

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

What is claimed is:

1. A computerized system comprising:
    one or more processors; and
    computer storage memory having computer-executable instructions stored thereon which, when executed by the one or more processors, implement a method comprising:
  determining a first set of attributes of a geographical area associated with a target location, the target location being a location that one or more items are to be delivered to by an unmanned aerial vehicle (UAV);
  comparing the first set of attributes with a second set of attributes for each UAV, of a plurality of UAVs, the second set of attributes include an identifier that specifies a release mechanism type for a respective UAV, of the plurality of UAVs, wherein the release mechanism type for at least a portion of the plurality of UAVs includes at least one of a landing release mechanism or a parachute release mechanism, the landing release mechanism being configured to cause the one or more items to be deployed from the respective UAV directly onto a surface of a landing area that the respective UAV lands on;
  based at least in part on the release mechanism type for each UAV, of the plurality of UAVs and the first set of attributes, selecting a first UAV, of the plurality of UAVs, to deliver the one or more items to the target location; and
  based on the selecting, causing the first UAV to deliver the one or more items to the target location.

2. The system of claim 1, wherein the determining includes detecting, via a machine learning model, objects within the geographical area, wherein the selecting of the first UAV is based at least in part on the objects detected via the machine learning model.

3. The system of claim 1, the method further comprising receiving mapping data via one or more on-board sensors located on one or more UAVs that have traversed over the geographical area, the mapping data indicates an image of the geographical area and further includes metadata associated with the geographical area, wherein the determining is based on analyzing the mapping data.

4. The system of claim 1, the method further comprising:
    receiving historical flight data that indicates attributes associated with one or more historical deliveries and one or more UAVs that have traversed over the geographical area to make the one or more historical deliveries; and predicting, via a machine learning model, whether the first UAV will be successful in delivering the one or more items based on the historical flight data, wherein the selection of the first UAV is further based on the predicting.

5. The system of claim 4, the method further comprising:
receiving the historical flight data;
extracting features from the historical flight data; and
training, prior to the predicting, the machine learning model based on learning weights associated with the features, and wherein the predicting is based on the training.

6. The system of claim 1, wherein the first set of attributes include a weight of the one or more items, one or more dimensions of the one or more items, and a flight distance from an origin location to the target location, and wherein the selection of the first UAV is based at least in part on the weight, the one or more dimensions, and the flight distance.

7. The system of claim 1, wherein the first set of attributes include a time of day that the one or more items are to be delivered to the target location, and traffic data associated with the geographical area, the traffic data indicates what traffic is or will be like in locations associated with the target location.

8. The system of claim 1, wherein the selection of the first UAV is based at least in part on determining that the landing release mechanism or the parachute release mechanism is most suited to deliver the one or more items to the target location.

9. The system of claim 1, the method further comprising:
selecting a route to deliver the one or more items to the target location based on the comparing.

10. A computer-implemented method comprising:
determining a first set of attributes associated with a target location, the target location being a location that one or more items are to be delivered to by an unmanned aerial vehicle (UAV);
determining a second set of attributes, the second set of attributes indicate attributes of each UAV of a plurality of UAVs, the second set of attributes including a noise factor indicator of each UAV, the noise factor indicator indicates how loud a respective UAV is while operating;
based at least in part on the first set of attributes and the noise factor indicator, recommending a UAV, of the plurality of UAVs, to deliver the one or more items to the target location; and
based on the recommending, causing the UAV to deliver the one or more items to the target location.

11. The method of claim 10, wherein the determining of the first set of attributes includes detecting, via a Convolutional Neural Network (CNN), objects within a geographical area associated with the target location, wherein the recommending of the UAV is based at least in part on the objects detected via the CNN.

12. The method of claim 10, the method further comprising receiving mapping data via one or more on-board sensors located on one or more UAVs that have traversed over a geographical area associated with the target location, the mapping data indicates an image of the geographical area and further includes metadata associated with the geographical area, wherein the determining of the first set of attributes is based on analyzing the mapping data.

13. The method of claim 10, the method further comprising:
receiving historical flight data that indicates attributes associated with one or more historical deliveries and one or more UAVs that have traversed over a geographical area associated with the target location to make the one or more historical deliveries.

14. The method of claim 13, the method further comprising:
extracting features from the historical flight data;
training a machine learning model based on learning weights associated with the features; and
based on the training, generating a decision statistic associated with a feature of the target location, the one or more items, or the UAV, wherein the recommending of the UAV is further based on the generating of the decision statistic.

15. The method of claim 10, wherein the second set of attributes include at least one attribute in a group of attributes consisting of: a weight carrying capacity of each UAV, one or more dimension carrying capacities of each UAV, and a flight distance capability of each UAV, and wherein the recommending of the UAV is based at least in part on the weight carrying capacity, the one or more dimension carrying capacities, or the flight distance capability.

16. The method of claim 10, wherein the second set of attributes include at least one attribute in a group of attributes consisting of: a weather grade indicator of each UAV, and a release mechanism type of the UAV.

17. The method of claim 16, wherein the release mechanism type includes at least one type of a group of types consisting of: a tether release mechanism, a landing release mechanism, and a parachute release mechanism, and wherein the recommending of the UAV is based at least in part on determining that the tether release mechanism, the landing release mechanism, or the parachute release mechanism is most suited to deliver the one or more items to the target location.

18. The method of claim 10, the method further comprising:
selecting a route to deliver the one or more items to the target location based on the comparing.

19. One or more computer storage media having computer-executable instructions embodied thereon that, when executed, by one or more processors, cause the one or more processors to perform a method, the method comprising:
receiving a mission profile, the mission profile describes first one or more attributes associated with a delivery of one or more items that are to be made to a target location;
receiving a plurality of Unmanned Vehicle (UAV) profiles, each UAV profile, of the plurality of UAV profiles describes second one or more attributes of a respective UAV, of a plurality of UAVs;
based on the mission profile for each UAV, of the plurality of UAVs, determining whether a release mechanism type of each UAV is a tether release mechanism, a landing release mechanism, and a parachute release mechanism;
based at least in part on the first one or more attributes and the determining, selecting a UAV, of the plurality of UAVs, as a candidate to deliver the one or more items to the target location, and
based on the selection, causing the UAV to deliver the one or more items to the target location.

20. The one or more computer storage media of claim 19, wherein the method further comprises generating, in response to the selection, a user interface that indicates the selection.

* * * * *